(12) United States Patent
Jiang

(10) Patent No.: US 7,742,763 B2
(45) Date of Patent: Jun. 22, 2010

(54) DYNAMIC GENERATION OF CSI FOR OUTBOUND ROAMERS

(75) Inventor: John Yue Jun Jiang, Danville, CA (US)

(73) Assignee: Roamware, Inc., San Jose, CA (US)

( * ) Notice: Subject to any disclaimer, the term of this patent is extended or adjusted under 35 U.S.C. 154(b) by 457 days.

(21) Appl. No.: 11/366,017

(22) Filed: Mar. 2, 2006

(65) Prior Publication Data

US 2006/0240822 A1   Oct. 26, 2006

Related U.S. Application Data

(60) Provisional application No. 60/657,798, filed on Mar. 2, 2005.

(51) Int. Cl.
*H04Q 7/20* (2006.01)
(52) U.S. Cl. ............... 455/433; 455/456.1; 455/435.2; 455/413; 455/445; 455/408; 455/466; 455/558; 370/356; 370/349; 370/466; 370/392; 370/352; 370/354; 370/338; 709/206
(58) Field of Classification Search .............. 455/456.1, 455/417, 435.2, 433, 445, 432.1, 408, 466, 455/414.3, 132.3, 558, 413; 370/356, 349, 370/466, 392, 338, 352, 354; 709/206
See application file for complete search history.

(56) References Cited

U.S. PATENT DOCUMENTS 5,353,328 A   10/1994   Jokimies (Continued)

FOREIGN PATENT DOCUMENTS

CA   2281041 A1   2/2001

(Continued)

OTHER PUBLICATIONS

Digital cellular telecommunications system (Phase 2+); Specification of the SIM Application Toolkit for the Subscriber Identity Module-Mobile Equipment (SIM-ME) Interface (GSM 11,14 version 8.3.0 Release 1999) STSI TS 101 267 V8.3.0, XX, XX, Aug. 2000, pp. 1-69 and pp. 114-115 (XP-002222021).

(Continued)

*Primary Examiner*—Rafael Pérez-Gutiérrez
*Assistant Examiner*—Joseph Arevalo
(74) *Attorney, Agent, or Firm*—Arent Fox LLP

(57) ABSTRACT

The present invention provides a system and method for providing Customized Applications for Mobile network Enhanced Logic (CAMEL) Subscription Information (CSI) of an outbound roamer of a Home Public Mobile Network (HPMN) such that the outbound roamer is roaming in a Visited Public Mobile Network (VPMN). The system comprises a roamers database storing an outbound roamer record of at least one outbound roamer, wherein the outbound roamer record comprises at least the International Mobile Subscriber Identity (IMSI) of the outbound roamer. The system further comprises a detection block to detect whether provisioning of the CSI is required for the outbound roamer and a CSI generation block to generate the CSI of the outbound roamer based on at least the IMSI of the outbound roamer, if the provisioning of the CSI is required. The system further comprises a provisioning block to provision the generated CSI of the outbound roamer to at least one CSI storing node.

50 Claims, 19 Drawing Sheets

U.S. PATENT DOCUMENTS

| | | |
|---|---|---|
| 5,586,166 A | 12/1996 | Turban |
| 5,742,910 A | 4/1998 | Gallant et al. |
| 5,764,730 A | 6/1998 | Rabe et al. |
| 5,818,824 A | 10/1998 | Lu et al. |
| 5,854,982 A | 12/1998 | Chambers et al. |
| 5,901,359 A | 5/1999 | Malmstrom |
| 5,903,832 A | 5/1999 | Seppanen et al. |
| 5,930,701 A | 7/1999 | Skog |
| 5,940,490 A | 8/1999 | Foster et al. |
| 5,943,620 A | 8/1999 | Boltz et al. |
| 5,953,653 A | 9/1999 | Josenhans et al. |
| 5,987,318 A | 11/1999 | Alperovich et al. |
| 5,987,323 A | 11/1999 | Huotari |
| 5,987,325 A | 11/1999 | Tayloe |
| 6,014,561 A | 1/2000 | Mölne |
| 6,052,604 A | 4/2000 | Bishop et al. |
| 6,058,309 A | 5/2000 | Huang et al. |
| 6,075,855 A | 6/2000 | Christiansen et al. |
| 6,085,084 A | 7/2000 | Christmas |
| 6,138,005 A | 10/2000 | Park |
| 6,138,009 A | 10/2000 | Birgerson |
| 6,148,197 A | 11/2000 | Bridges et al. |
| 6,163,701 A | 12/2000 | Saleh et al. |
| 6,185,295 B1 | 2/2001 | Frederiksen et al. |
| 6,185,436 B1 | 2/2001 | Vu |
| 6,192,255 B1 | 2/2001 | Lewis et al. |
| 6,195,532 B1 | 2/2001 | Bamburak et al. |
| 6,208,864 B1 | 3/2001 | Agrawal et al. |
| 6,212,372 B1 | 4/2001 | Julin |
| 6,353,740 B1* | 3/2002 | Granberg ................ 455/432.1 |
| 6,356,755 B1 | 3/2002 | Valentine et al. |
| 6,356,756 B1 | 3/2002 | Koster |
| 6,456,845 B1 | 9/2002 | Drum et al. |
| 6,456,859 B1 | 9/2002 | Desblancs et al. |
| 6,463,298 B1 | 10/2002 | Sorenson et al. |
| 6,466,786 B1 | 10/2002 | Wallenius |
| 6,505,050 B1 | 1/2003 | Brudos et al. |
| 6,515,974 B1 | 2/2003 | Inoue et al. |
| 6,574,481 B1 | 6/2003 | Rathnasabapathy et al. |
| 6,603,761 B1 | 8/2003 | Wang et al. |
| 6,603,968 B2 | 8/2003 | Anvekar et al. |
| 6,611,516 B1 | 8/2003 | Pirkola et al. |
| 6,628,934 B2 | 9/2003 | Rosenberg et al. |
| 6,636,502 B1 | 10/2003 | Lager et al. |
| 6,671,523 B1 | 12/2003 | Niepel et al. |
| 6,684,073 B1 | 1/2004 | Joss et al. |
| 6,687,243 B1* | 2/2004 | Sayers et al. ................. 370/356 |
| 6,693,586 B1 | 2/2004 | Walters et al. |
| 6,738,622 B1 | 5/2004 | Stadelmann et al. |
| 6,738,636 B2 | 5/2004 | Lielbriedis |
| 6,764,003 B1 | 7/2004 | Martshitsch et al. |
| 6,782,264 B2 | 8/2004 | Anderson |
| 6,795,444 B1 | 9/2004 | Vo et al. |
| 6,856,818 B1 | 2/2005 | Ford |
| 6,876,860 B1 | 4/2005 | Berg et al. |
| 6,920,487 B2 | 7/2005 | Sofer et al. |
| 6,925,299 B1 | 8/2005 | Sofer et al. |
| 6,961,559 B1 | 11/2005 | Chow et al. |
| 6,963,543 B2 | 11/2005 | Diep et al. |
| 6,968,383 B1 | 11/2005 | Heutschi et al. |
| 6,975,852 B1 | 12/2005 | Sofer et al. |
| 6,978,156 B1 | 12/2005 | Papadopoulos et al. |
| 7,020,479 B2 | 3/2006 | Martschitsch |
| 7,139,570 B2 | 11/2006 | Elkarat et al. |
| 7,184,764 B2 | 2/2007 | Raviv et al. |
| 7,231,431 B2 | 6/2007 | Sofer et al. |
| 2002/0009199 A1 | 1/2002 | Ala-Laurila et al. |
| 2002/0012351 A1 | 1/2002 | Sofer et al. |
| 2002/0037708 A1 | 3/2002 | McCann et al. |
| 2002/0087631 A1 | 7/2002 | Sharma |
| 2002/0101858 A1 | 8/2002 | Stuart et al. |
| 2002/0101859 A1 | 8/2002 | Maclean |
| 2002/0160763 A1 | 10/2002 | Mittal et al. |
| 2002/0187780 A1 | 12/2002 | Souissi |
| 2002/0191575 A1 | 12/2002 | Kalavade et al. |
| 2002/0196775 A1 | 12/2002 | Huotori |
| 2003/0008643 A1* | 1/2003 | Hestir ........................ 455/417 |
| 2003/0017843 A1 | 1/2003 | Noblins |
| 2003/0050047 A1 | 3/2003 | Ala-Luukko |
| 2003/0051041 A1 | 3/2003 | Kalavade et al. |
| 2003/0064723 A1 | 4/2003 | Thakker |
| 2003/0069922 A1 | 4/2003 | Arunachalam |
| 2003/0087647 A1* | 5/2003 | Hurst ......................... 455/456 |
| 2003/0129991 A1 | 7/2003 | Allison et al. |
| 2003/0133421 A1 | 7/2003 | Sundar et al. |
| 2003/0139180 A1 | 7/2003 | McIntosh et al. |
| 2003/0208560 A1 | 11/2003 | Inoue |
| 2003/0224795 A1 | 12/2003 | Wilhoite et al. |
| 2003/0227899 A1* | 12/2003 | McCann ...................... 370/349 |
| 2003/0229791 A1 | 12/2003 | De Jong |
| 2004/0019539 A1 | 1/2004 | Raman et al. |
| 2004/0053610 A1 | 3/2004 | Kim |
| 2004/0082346 A1 | 4/2004 | Skytt et al. |
| 2004/0087305 A1 | 5/2004 | Jiang et al. |
| 2004/0120552 A1 | 6/2004 | Borngraber et al. |
| 2004/0131023 A1 | 7/2004 | Auterinen |
| 2004/0132449 A1 | 7/2004 | Kowarch |
| 2004/0148400 A1 | 7/2004 | Mostafa |
| 2004/0196858 A1 | 10/2004 | Tsai et al. |
| 2004/0224680 A1 | 11/2004 | Jiang |
| 2004/0229601 A1 | 11/2004 | Zabawskyj et al. |
| 2004/0236836 A1 | 11/2004 | Appelman |
| 2005/0021834 A1 | 1/2005 | Coulombe |
| 2005/0047378 A1 | 3/2005 | Wuschke et al. |
| 2005/0064883 A1 | 3/2005 | Heck et al. |
| 2005/0070278 A1 | 3/2005 | Jiang |
| 2005/0186939 A1 | 8/2005 | Barnea et al. |
| 2005/0186960 A1 | 8/2005 | Jiang |
| 2005/0186979 A1 | 8/2005 | McCann et al. |
| 2005/0192007 A1 | 9/2005 | Kumar et al. |
| 2005/0192035 A1 | 9/2005 | Jiang |
| 2005/0215250 A1 | 9/2005 | Chava et al. |
| 2005/0232282 A1 | 10/2005 | Silver et al. |
| 2005/0250493 A1 | 11/2005 | Elkarat et al. |
| 2006/0003775 A1 | 1/2006 | Bull et al. |
| 2006/0009204 A1 | 1/2006 | Ophir |
| 2006/0025129 A1 | 2/2006 | Wolfman et al. |
| 2006/0046721 A1* | 3/2006 | Sernan-Dez Arppe et al. .... 455/435.2 |
| 2006/0052113 A1 | 3/2006 | Ophir et al. |
| 2006/0068778 A1 | 3/2006 | Della-Torre |
| 2006/0068786 A1 | 3/2006 | Florence |
| 2006/0079225 A1 | 4/2006 | Wolfman et al. |
| 2006/0079236 A1 | 4/2006 | Del Pino et al. |
| 2006/0148459 A1 | 7/2006 | Wolfman et al. |
| 2006/0149658 A1* | 7/2006 | Smith ......................... 705/37 |
| 2006/0205404 A1 | 9/2006 | Gonen et al. |
| 2006/0211420 A1 | 9/2006 | Ophir et al. |
| 2007/0021118 A1 | 1/2007 | Ophir et al. |
| 2007/0049269 A1 | 3/2007 | Ophir et al. |
| 2007/0054665 A1 | 3/2007 | Elkarat et al. |
| 2007/0072587 A1 | 3/2007 | Della-Torre et al. |
| 2007/0178885 A1 | 8/2007 | Lev et al. |
| 2007/0232300 A1 | 10/2007 | Wolfman |
| 2007/0259663 A1 | 11/2007 | Weintraub et al. |
| 2008/0020760 A1 | 1/2008 | Elkarat et al. |

FOREIGN PATENT DOCUMENTS

| | | |
|---|---|---|
| EP | 0899 974 A2 | 3/1999 |
| EP | 1389024 | 2/2004 |
| GB | 2322998 | 9/1998 |
| WO | WO 98/26621 A2 | 6/1998 |
| WO | WO 98/26626 A2 | 6/1998 |

| | | |
|---|---|---|
| WO | WO 00/18156 A1 | 3/2000 |
| WO | WO 00/51375 A | 8/2000 |
| WO | WO 00/79761 A | 12/2000 |
| WO | WO 00/79825 A | 12/2000 |
| WO | WO 01/22750 | 3/2001 |
| WO | WO 01/65884 | 9/2001 |
| WO | WO 02/41641 A2 | 5/2002 |
| WO | WO 02/019667 | 7/2002 |
| WO | WO 03/019960 A1 | 3/2003 |
| WO | WO 03/043367 A | 5/2003 |
| WO | WO 03/065660 A | 8/2003 |
| WO | WO2004/023773 A1 * | 3/2004 |
| WO | WO 2004/081802 | 9/2004 |
| WO | WO2004/075598 | 9/2005 |
| WO | WO2005/101857 | 10/2005 |
| WO | WO2008/012815 | 1/2008 |

OTHER PUBLICATIONS

"Digital Cellular Telecommunications system (Phase 2+); Universal Mobile Telecommunications system (UMTS); General Packet Radio Service (GPRS) Service description; Stage 2 (3GPP TS 23.060 Version 5.4.0 Release 5)" ETSI TS 123 060 V5.4.0, Dec. 2002, pp. 1-207 (XP-014007573).

"Digital Cellular Telecommunications system (Phase 2+); Universal Mobile Telecommunications system (UMTS); General Packet Radio Service (GPRS); GPRS Tunnelling Protocol (GTP) across the Gn and Gp Interface (3GPP TS 29.060 version 5.4.0 Release 5)" ETSI TS 129 060 V5.4.0, Dec. 2002. pp. 1-102 (XP-002298277).

Ala-Laurila, et al., "Wireless LAN Access Network Architecture for Mobile Operators," IEEE Communications Magazine, Nov. 2001, pp. 82-89 (XP-001107810).

Brunen, M. "Roaming im Zugangsnetz Mit OWLAN uberall zu Hause sein, "Net-Zeitschrift Fuer Kommunikationsmangement, Huthig Verlag, Heilderberg 2002, pp. 39-42 (XP-001122438).

GSM Association Permanent Reference Document: IR.33, PRD IR.33 "GPRS Roaming Guidelines," version 3.2.0, Apr. 3, 2003, pp. 1-20 (XP-002298278).

Ostrowski, F., "Roaming und Handover zwischen UMTS und Funk-LA," NTZ (Nachrichtentechnische zeitschrift), 2002, pp. 24-26 (XP-001132263).

Telenor (origin GSMA), "Inter-PLMN Backbone Guidelines," S3z000005 3GPP TSG SA WG3 Security—S3#15bis, Ad-Hoc Meeting Nov. 8, 2000, pp. 1-30 (XP-002298276).

"Universal Mobile Telecommunications system (UMTS) NAS Functions Related to Mobile Station MS in Idle Mode" ETSI TS 123 122 V3.1.0, Jan. 2000, pp. 1-33.

"Digital Cellular Telecommunications System (Phase 2+) GSM; Univeral Mobile Telecommunications System (UMTS); Mobile Radio Interface Layer 3 Specification; Core Network Protocols, Stage 3" ETSI TS 124 008 V3.2.1, Jan. 2000, pp. 62-69 and 376.

Salman A. Baset et al., "An analysis of the Skype Peer-to-Peer Internet Telephony Protocol", Department of Computer Science, Sep. 15, 2004, 12 pages.

Salkintzis, et al., "WLAN-GPRS Integration for Next-Generation Mobile Data Networks," IEEE Wireless Communications, Oct. 2002, pp. 112-123 (XP-001132263).

Michael Mouly, "The GSM System for Mobile Communications", pp. 103-104. Cell and Sys, 1992.

GSM 378 on CAMEL Digital Cellular telecommunications system (Phase 2+);Customized Applications for Mobile network Enhanced Logic (CAMEL) Phase 2; Stage 2 (GSM 03.78 version 6.7.0 Release 1997).

GSM978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).

GSM 902 on Map Specification Digital Cellular Telecommunications (Phase 2+); Mobile Application Part (MAP) Specification (3GPP TS 09.02 version 7.9.0 Release 1998).

Q760-Q769 on ISUP Signaling, Function and Procedure.

Q.761 (Functional description of the ISDN User Part of CCITT Signaling System No. 7).

Q762 (General Functions of CCITT Signaling System No. 7 ISDN User Part Messages and parameters).

Q 763 (Formats and codes of CCITT Signaling System No. 7 ISDN User Part Message and parameters).

Q 764 (1999), Signaling System No. 7—ISDN User Part signaling procedures.

Q 730 (1999), ISDN User Part supplementary services.

Q 711 (1996), Functional description of signaling connection control part.

Q 712 (1996), Definition and function of signaling connection control part messages.

Q713 (1996), Signaling connection control part formats and codes.

Q 714 (1996), Signal connection control part procedures.

Q 716 (1993), Signaling Connection Control Part (SCCP) performance.

GSM 340 on SMS Digital cellular telecommunications system (Phase 2+); Technical realization of the Short Message Service (SMS); (GSM 03.40 version 7.4.0 Release 1998).

SMPP Forum: SMPP Protocol Document Version:—Oct. 12, 1999 Issue 1.2.

Universal Mobile Telecommunications System (UMTS); Multimedia Messaging Service (MMS), Functional description; Stage 2 (3GPP TS 23.140 version 4.2.0 Release 4).

GSM 379 on CAMEL Digital cellular telecommunications system (Phase 2+); Customized Applications for Mobile network Enhanced Logic (CAMEL); CAMEL Application Part (CAP) specification (GSM 09.78 version 7.1.0 Release 1998).

Technical Specification $3^{rd}$ Generation Partnership Project; Technical Specification Group Services and System Aspects; Service accessibility (Release 1999).

Signaling procedure and the Mobile Application Part (MAP) (Release 1999).

Q1214-Q1218 on Intelligent Networks IMS architectures, 3GPP, and 3GPP2.

GMS 408 on radio interface layer 3; Digital cellular telecommunications system (Phase 2+); Mobile radio interface layer 3 specification (GSM 04.08 version 7.4.2 Release 1998).

GSM 322 network selection Digital cellular telecommunications system (Phase 2+); functions related to Mobile Station (MS) in idle mode and group receive mode (GSM 03.22 version 8.3.0 Release 1999).

GSM 23122 network selection 3GPP TS 23.122 V3.9.0 (Dec. 2002) Technical Specification; $3^{rd}$ Generation Partnership Project; Technical Specification Group Core Network; NAS Functions related to Mobile Station (MS) in idle mode (release 1999).

GSM 22011 service accessibility; 3 GPP TS 22.011 V3.8.0 (Sep. 2002) Technical Specification; $3^{rd}$ Generation Partnership Project; Technical Specification Group Services and System Aspects; Service accessibility (Release 1999).

3 GPP 29010; 3 GPP TS 29.010 V3.10.0 (Dec. 2002); Technical Specification; $3^{rd}$ Generation Partnership Project; Technical Specification Group Core Network; Information element mapping between Mobile Station—Base Station System (MS-BSS) and Base Station System—Mobile-services Switching Centre (BSS-MSC): Signalling procedures and the Mobile Application Part (MAP) (Release 1999).

GSM 318 on CAMEL Basic Call Handling; Digital cellular telecommunications system (Phase 2+) Basic call handling; Technical realization (GSM 03.18 version 6.6.0 Release 1997).

ITU-T Recommendation Q. 766 (1993), Performance objectives in the integrated services digital network application.

ITU-T Recommendation Q. 765 (1998), Signaling system No. 7—Application transport mechanism.

ITU-T Recommendation Q. 769.1 (1999), Signaling system No. 7—ISDN user part enhancements for the support of Number Portability.

Q771-775X TCAP.

GSM 1111 SIM and Mobile Interface.

GSM 1114 SIM Toolkit.

IR 7320 Steering of Roaming.

GSM 348 Security and OTA.

GSM 31048 Security and OTA.

GSM 23119 Gateway Location Register.

GSM 408 Mobile Radio Interface Network Layer.

GSM 23122 Mobile Station Procedure.
GSM 24008 Mobile Radio Interface Network Layer.
GSM 25304 Idle Mode Selection.
GSM 29010 Error Network Mapping.
GSM 29002 MAP Protocol.
3G TS 22.078 version 3.2.0 Release 1999 UMTS CAMEL.
3G TS 23.278 version 6.0.0. Release 6 UMTS CAMEL-IMS interworking.
GSM 360 GPRS.
GSM 960 GPRS Tunneling Protocol.
GSM 23060 GPRS.
GSM 29060 GPRS Tunneling Protocol.
GSM 23012 Location Update.
Q701-705 on SS7 MTP.

"Digital cellular telecommunications system (Phase 2+); Customised Applications for Mobile network Enhanced Logic (Camel) Phase 2; Stage 2 (3GPP TS 03.78 version 7.8.1 Release 1998); ETSI TS 101 441" ETSI Standards, LIS, Sophia Antipolis Cedex, France, vol. 3-CN2; SMG3, No. V7.8.1, Aug. 1, 2002, XP014016036 ISSN: 0000-00001.

"Digital cellular telecommunications system (Phase 2+) (GSM); Universal Mobile Telecommunications System (UMTS); Technical Report on the Gateway Location Register (3GPP TR 23.909 version 4.0.0 Release 4); ETSI TR 123 909" ETSI Standards, LIS, Sophia Antipolis Cedex, France, vol. 3-CN2; 3-CN4, No. V4.0.0, Mar. 1, 2001, XP014005055 ISSN: 0000-0001.

* cited by examiner

DYNAMIC GENERATION OF CSI FOR OUTBOUND ROAMERS

CROSS REFERENCE TO RELATED APPLICATION

This application claims priority from U.S. Provisional Patent Application Ser. No. 60/657,798 entitled Dynamic CAMEL Approach for Implementing Call Services for Outbound Roamers, filed Mar. 2, 2005, the entirety of which is incorporated herein by reference.

BACKGROUND OF THE INVENTION

1. Field of the Invention

The present invention generally relates to outbound roamers. More specifically, the invention relates to dynamic provisioning of Customized Applications for Mobile network Enhanced Logic (CAMEL) Subscription Information (CSI) of the outbound roamers.

2. Background of the Technology

Various operators offer international roaming to their users utilizing mobile communication systems employed worldwide. One of the most lucrative aspects of international roaming for an operator is the revenue generated by outbound roaming. The operator generates revenue from outbound roaming when a subscriber of the operator's own home network, visits another network and makes calls. To increase outbound roaming revenue, many operators offer various value-added call control services to the outbound roamers.

These value added services may be provided both for Mobile Originated (MO) and Mobile Terminated (MT) outbound roamer calls. Some of these value added services for the MO calls include, but are not limited to, roaming home short-code, optimal routing, misdialed digit correction, prepaid roaming, Calling Line Identification (CLI) guarantee, and roaming fraud control. Value added services for the MT call for an outbound roamer include, but are not limited to; optimal routing for late call forwarding, incoming call screening and MT prepaid roaming. Roaming home short-code for a MO call from the outbound roamer allows the outbound roamer to dial a home network short-code, such as, customer care, or emergency at the visited network. This service then translates the short-code into the home or visited network long number. In case of an MT call for an outbound roamer, the incoming call screening service allows the outbound roamer to screen only selected callers to get through to the outbound roamer. Further, in case the outbound roamer misdials a number, i.e., a MO call, due to a wrong or missing international dialing prefix, the call may be intelligently corrected using the misdialed digits correction service.

Generally, implementing one or more of the above-mentioned value added services can include Customized Application for Mobile network Enhanced Logic (CAMEL). In that case, when the outbound roamer registers at the visiting network and initiates a call, an Originating CAMEL Subscription Information (O-CSI) is sent from a Home Location Register (HLR) of the home network of the roamer to a Visited Location Register (VLR) of the visiting network. The O-CSI enables the call control for the MO call from a VPMN VMSC to pass to a HPMN GSM Service Control Function (SCF). Similarly, for a MT call, the HLR sends a T-CSI to a HPMN GMSC, which in turn passes the call control to the HPMN gsmSCF. Therefore, for the MO call, the O-CSI is provisioned at the VLR, while for the MT call the T-CSI is provisioned at the HLR.

HLR is provisioned with the O-CSI and the T-CSI for the MO-call and the MT-call irrespective of whether the subscriber is outbound roaming or not. Further, the HLR is provisioned irrespective of whether the subscriber is currently outbound roaming on the CAMEL network or not. Moreover, the license cost of CAMEL subscription for the CSI by an HLR vendor is usually linked to the number of O-CSI or T-CSI or the number of subscribers defined with a CSI that are statically provisioned at the HLR. This static provisioning is irrespective of the number of O-CSI or T-CSI subscribers outbound roaming at any given time. Thus, subscriber-based charging by the HLR vendor often proves to be expensive for the operator.

On the other hand, certain HLR vendors have an upper-limit on the number of T-CSI and O-CSI to be provisioned at the HLR. In this case, the limit for storing the CSI in the HLR becomes a bottleneck for the operator.

One or more of the above-mentioned approaches suffer from the problem of static provisioning of the CSI at the HLR irrespective of the number of outbound roaming subscribers at a given time. This increases the cost for supporting the CAMEL subscribers. Thus, there is a need for an alternative approach that is cost-effective by keeping the number of CSI provisioned at the HLR low at any time.

DESCRIPTION OF THE DRAWINGS

Brief Description of the Drawings

Figure 1:
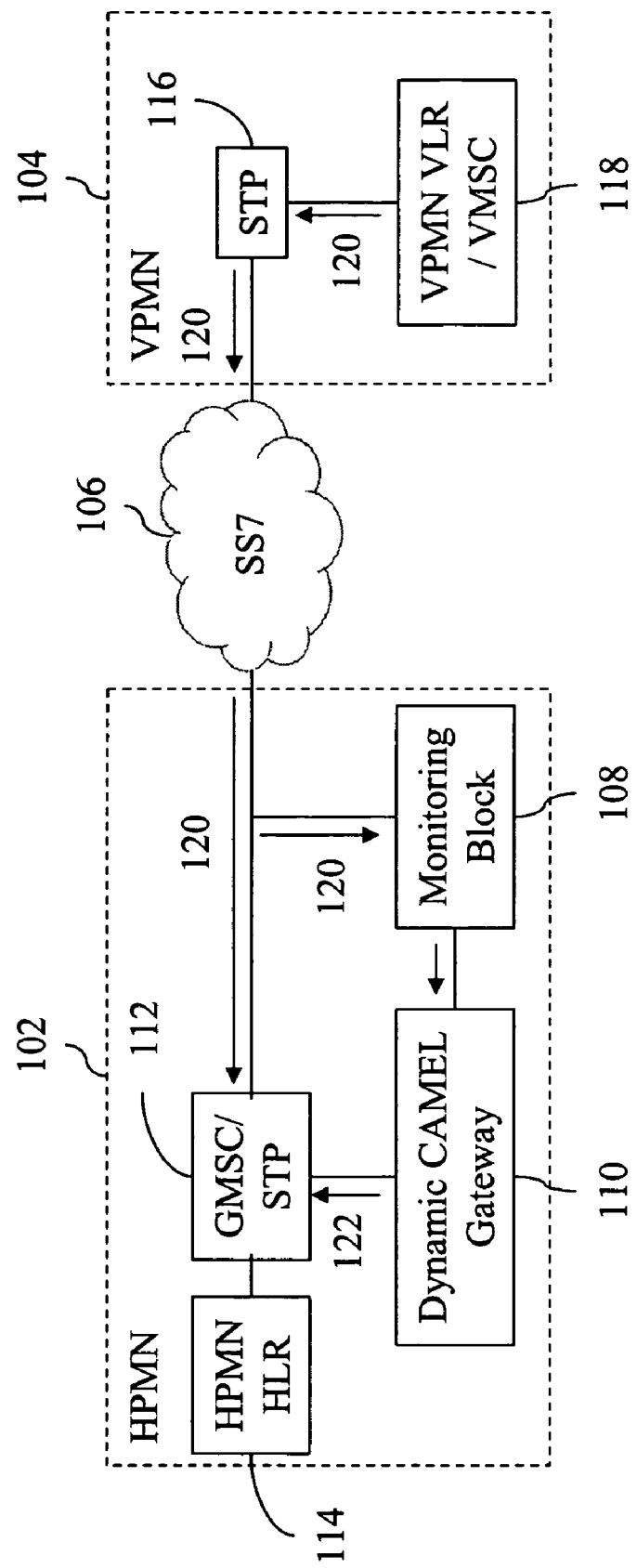

FIG. 1 illustrates a block diagram of a system in accordance with an embodiment of the present invention.

Figure 2:
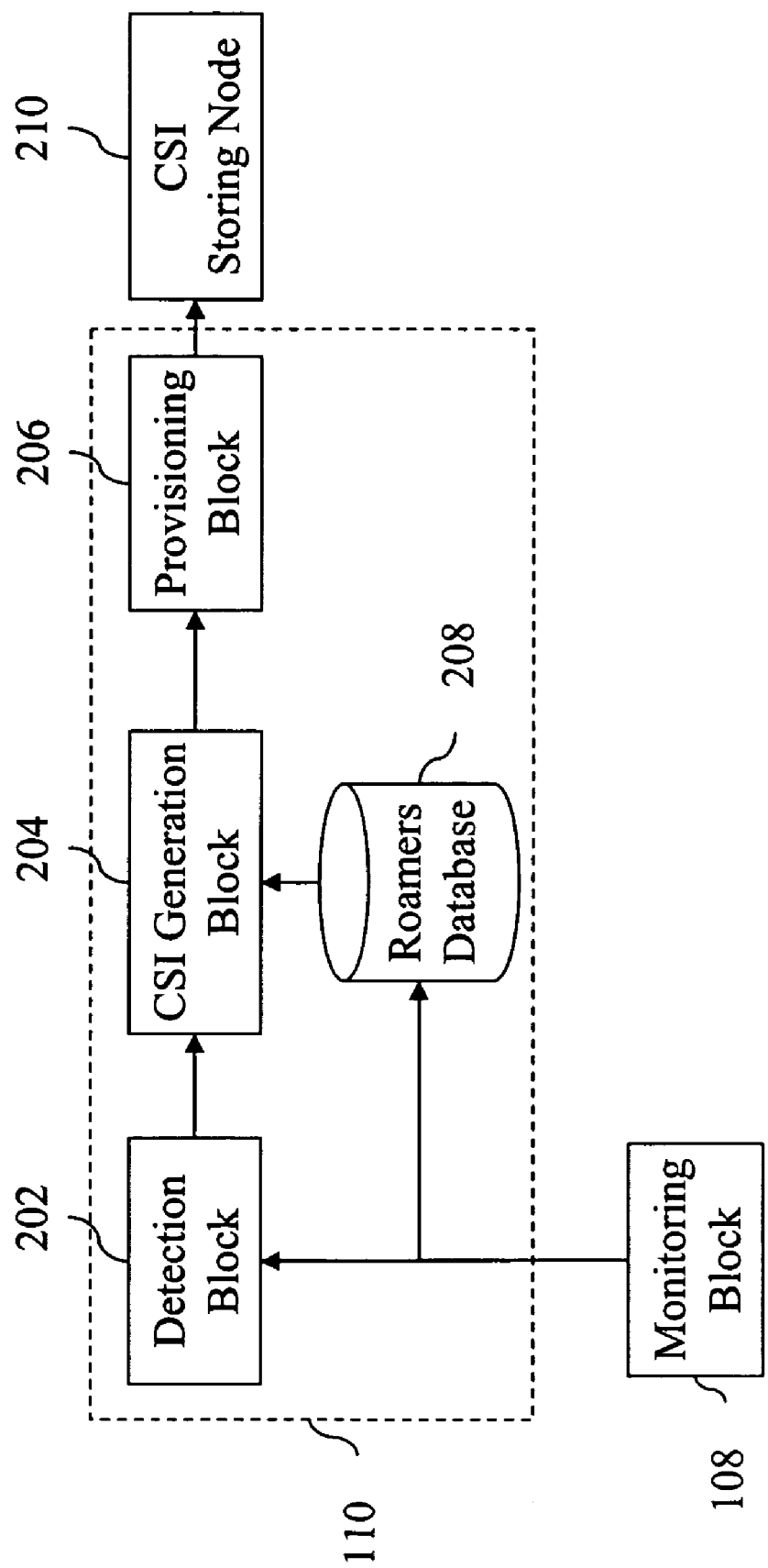

FIG. 2 illustrates a block diagram of the dynamic CAMEL gateway in accordance with an embodiment of the present invention.

Figure 3:
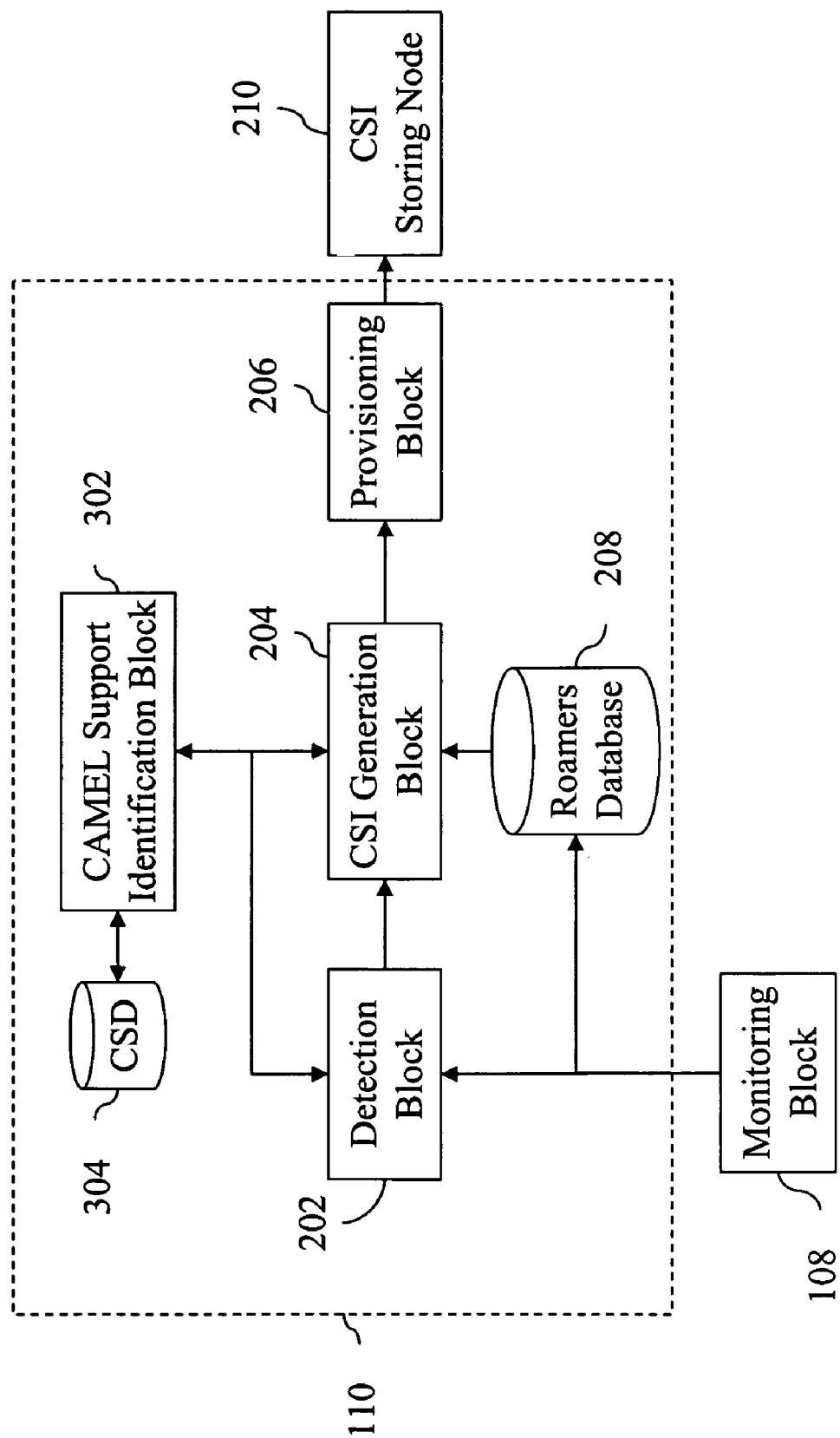

FIG. 3 illustrates a block diagram of the dynamic CAMEL gateway in accordance with another embodiment of the present invention.

Figure 4:
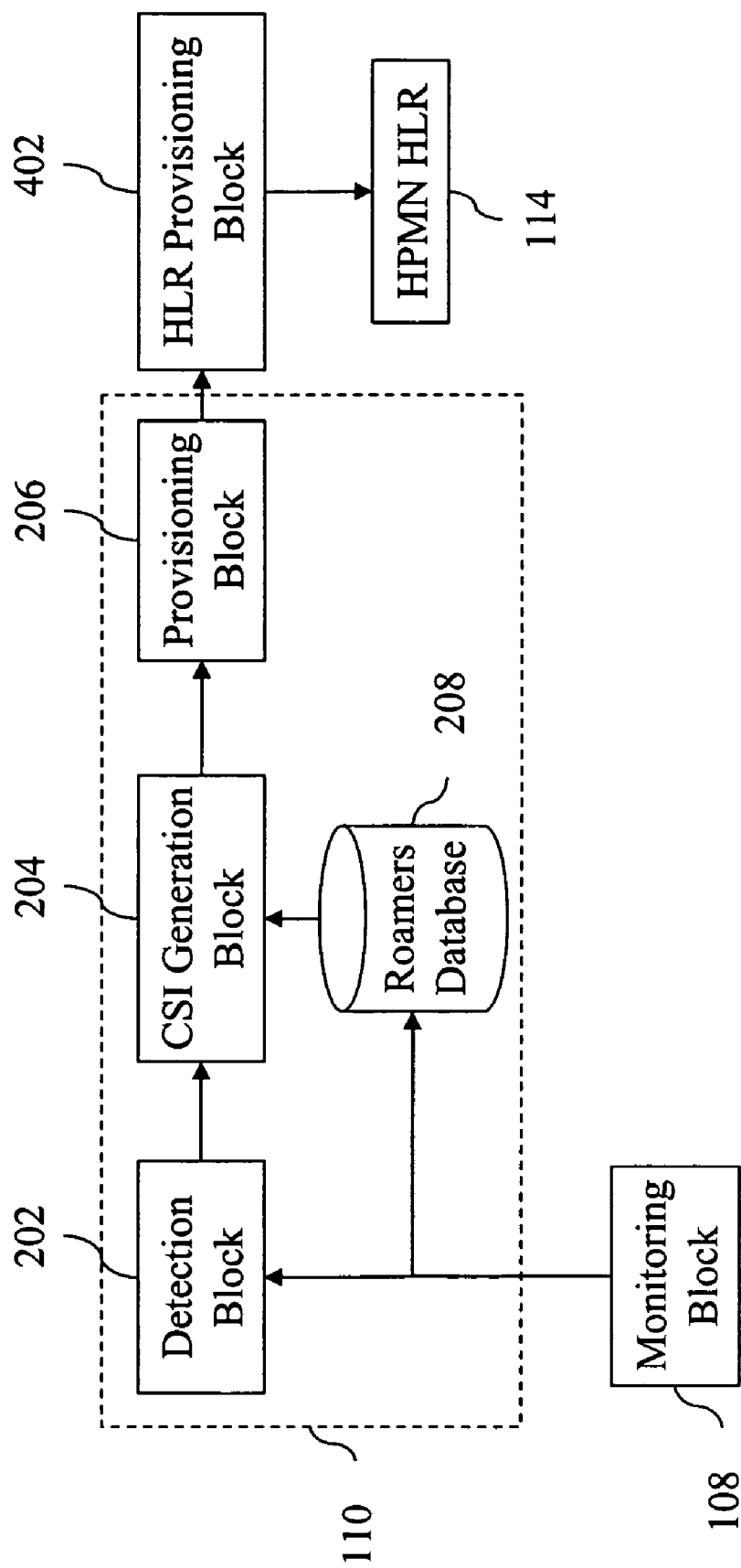

FIG. 4 illustrates a block diagram of the dynamic CAMEL gateway in accordance with yet another embodiment of the present invention.

Figure 5:
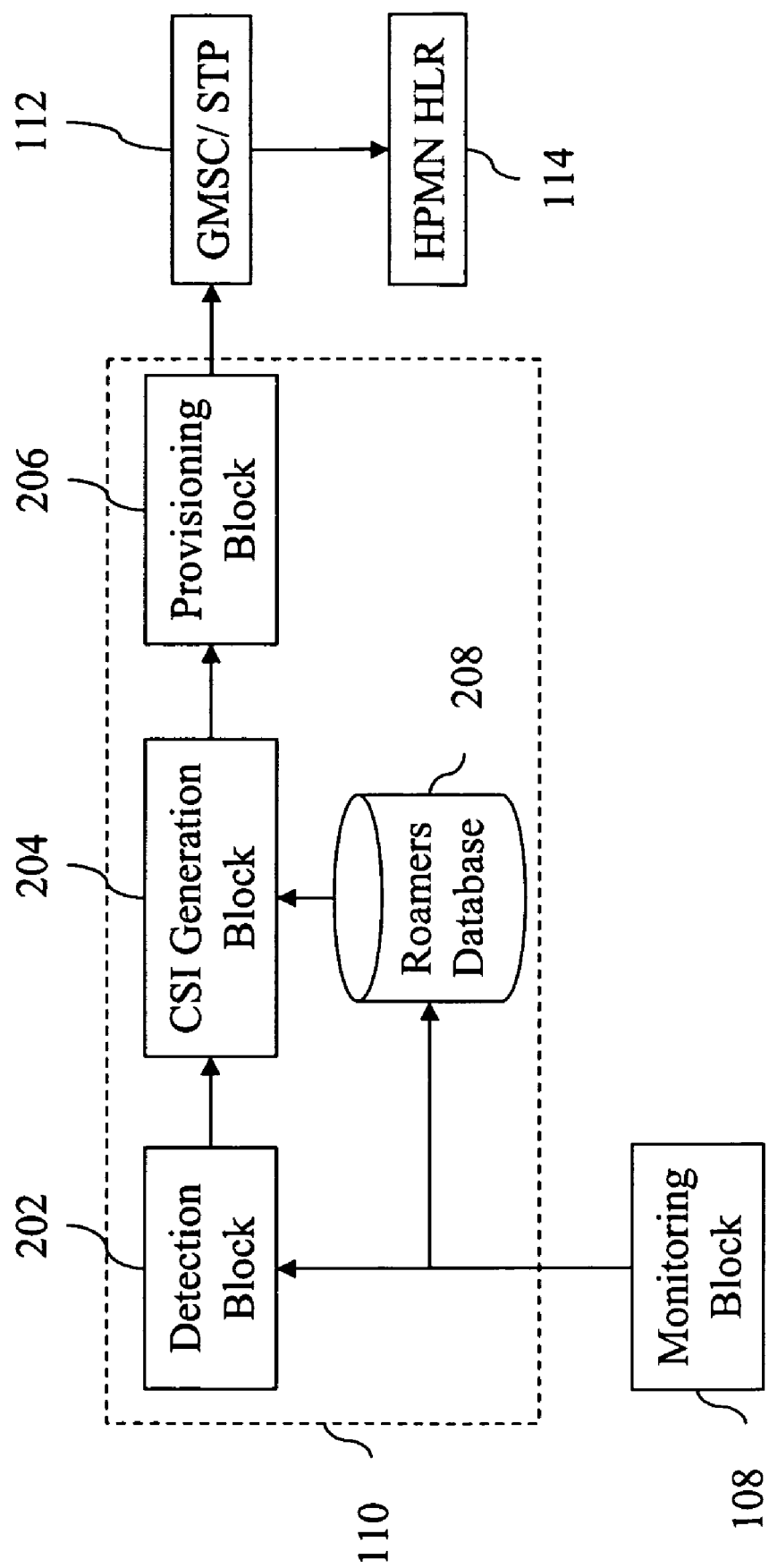

FIG. 5 illustrates a block diagram of the dynamic CAMEL gateway for provisioning MT-CSI at an HPMN GMSC/STP in accordance with an embodiment of the present invention.

Figure 6:
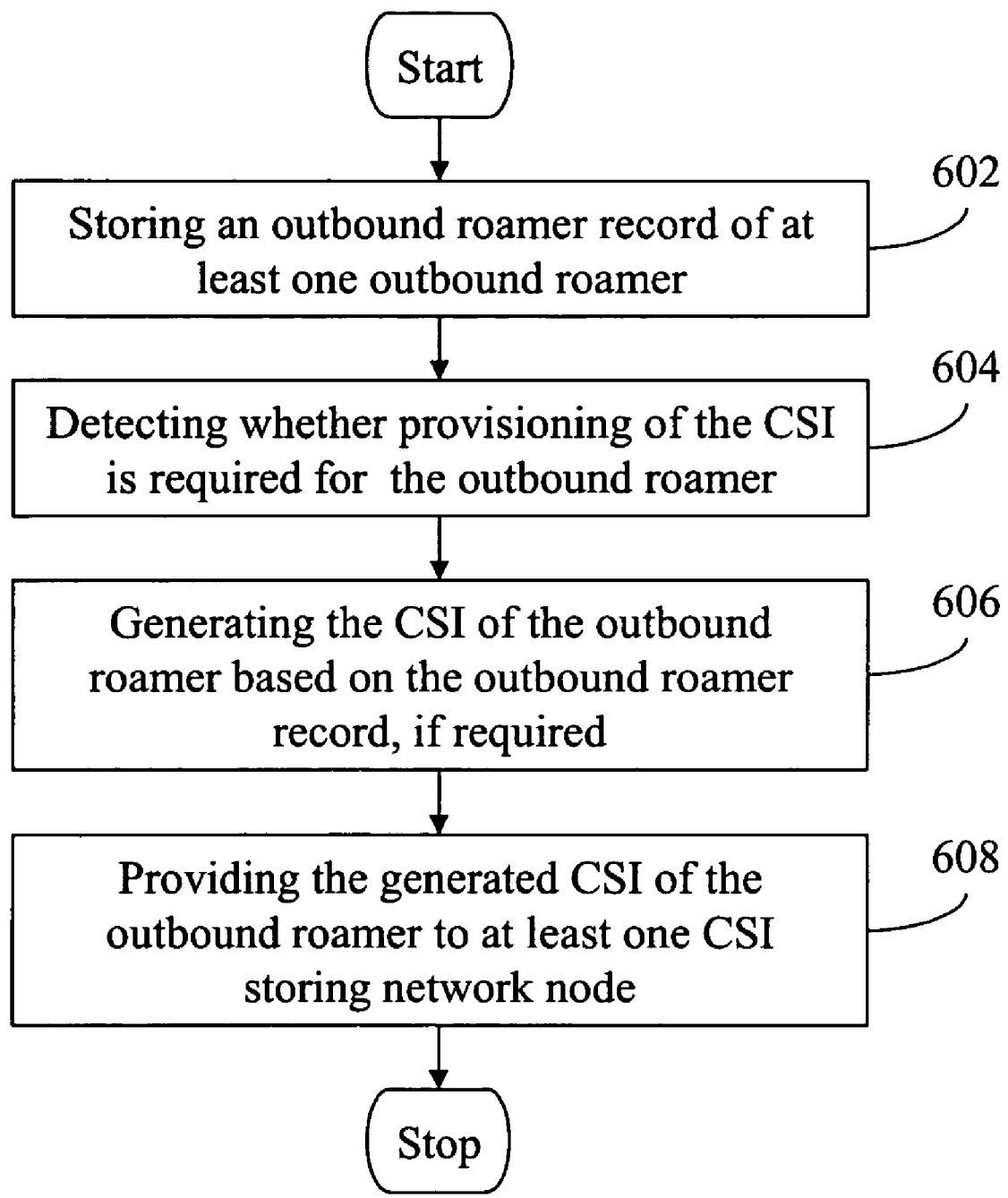

FIG. 6 illustrates a flowchart for providing CSI of an outbound roamer in accordance with an embodiment of the present invention.

Figure 7:
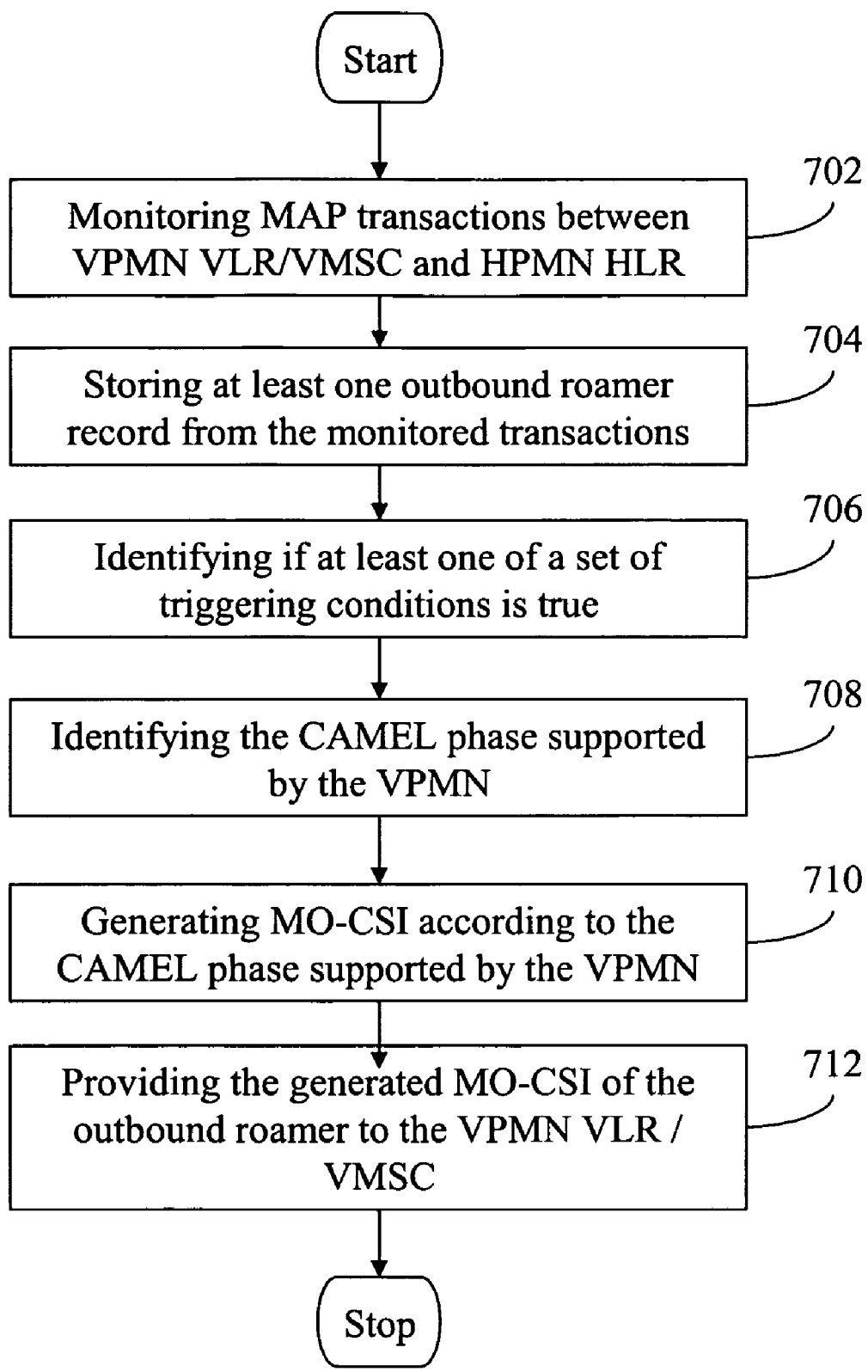

FIG. 7 illustrates a flowchart generation of MO-CSI in accordance with an embodiment of the present invention.

Figure 8:
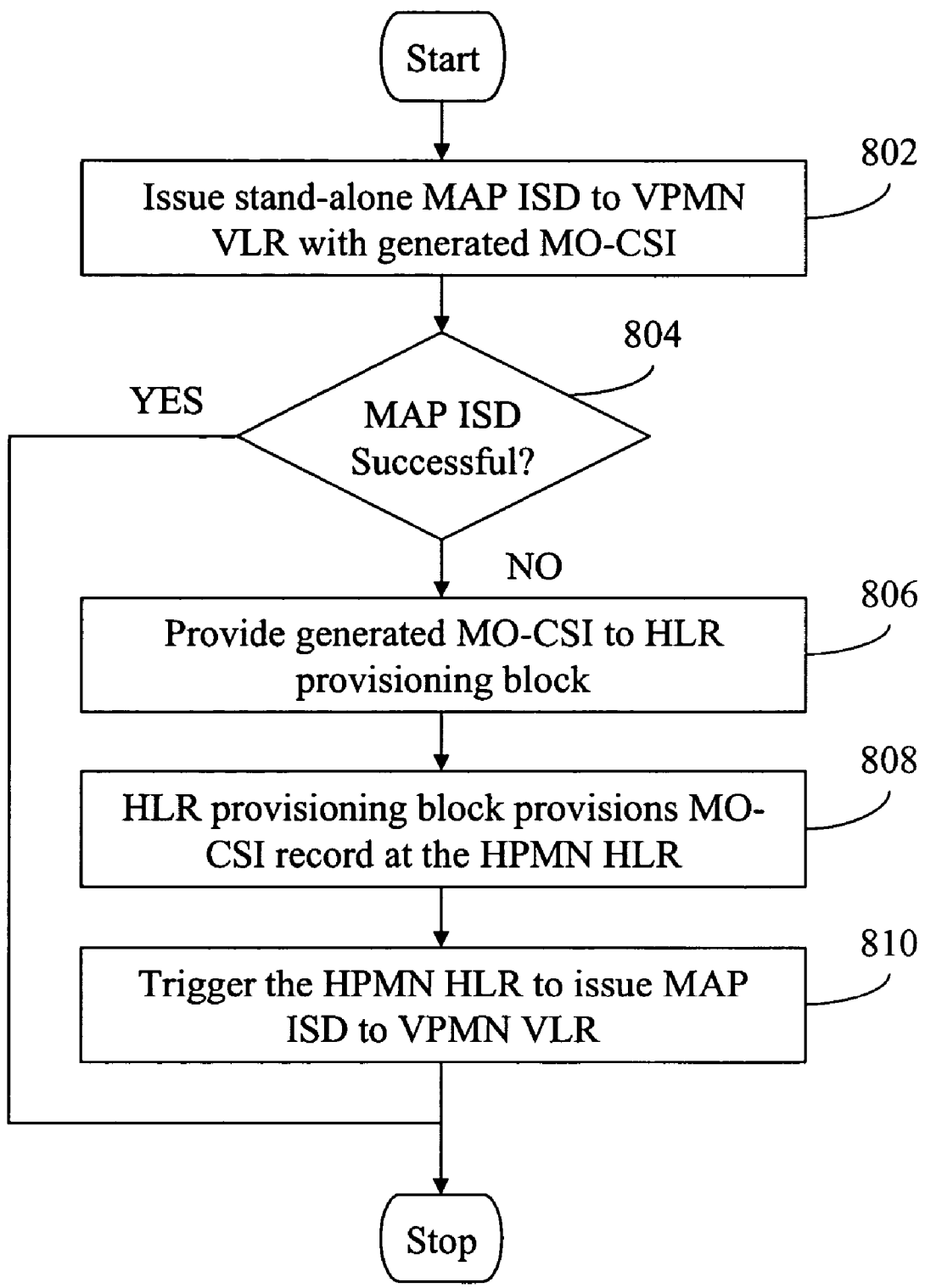

FIG. 8 illustrates a flowchart for provisioning the generated MO-CSI at a VPMN VLR/VMSC in accordance with an embodiment of the present invention.

Figure 9:
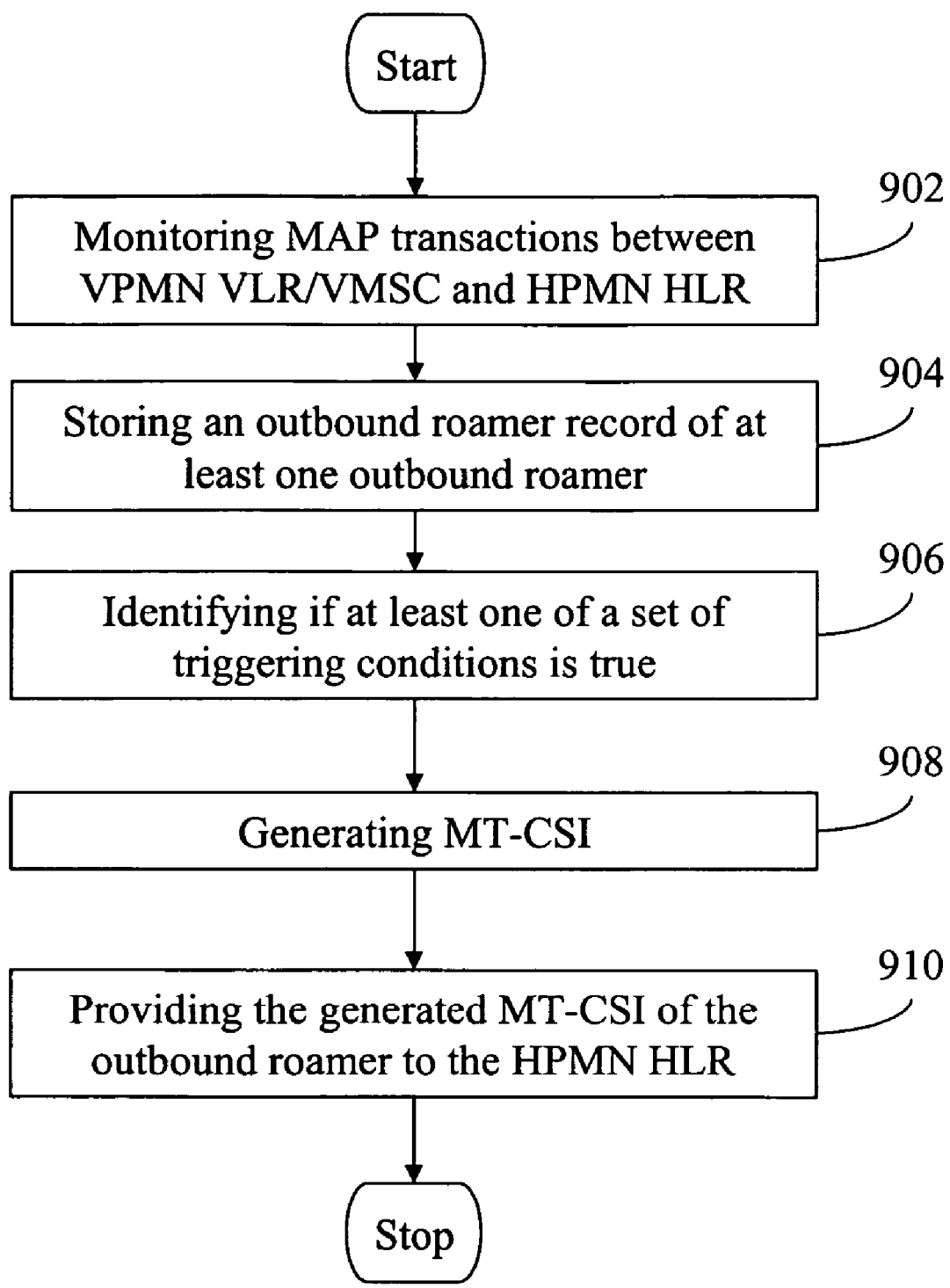

FIG. 9 illustrates a flowchart generation of MT-CSI in accordance with an embodiment of the present invention.

Figure 10:
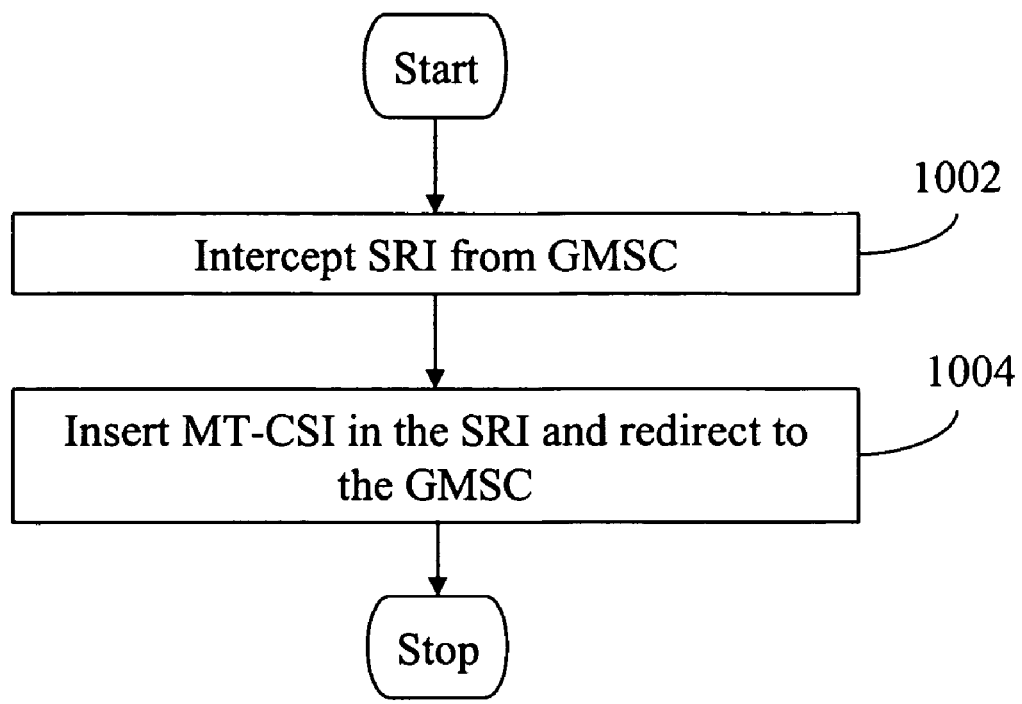

FIG. 10 illustrates a flowchart for provisioning the generated MT-CSI at an HPMN GMSC/STP in accordance with an embodiment of the present invention.

Figure 11:
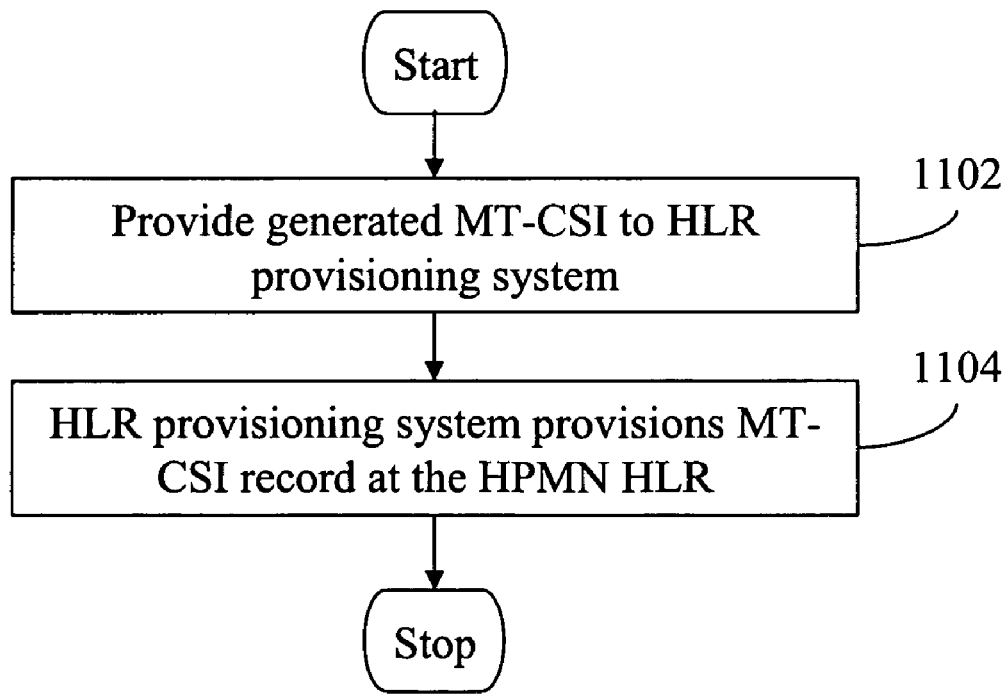

FIG. 11 illustrates a flowchart for provisioning the generated MT-CSI at an HPMN HLR in accordance with another embodiment of the present invention.

Figure 12:
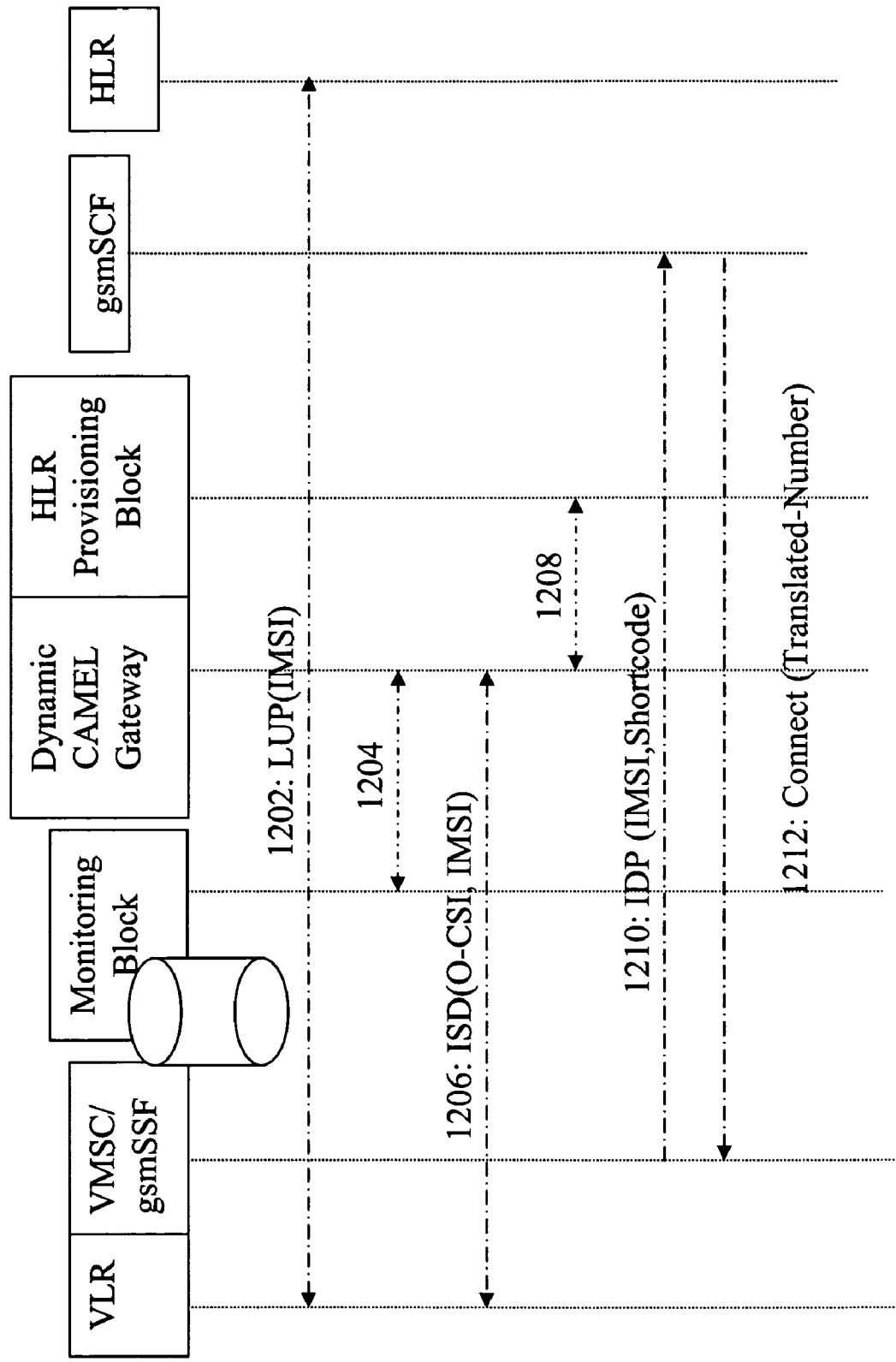

FIG. 12 illustrates a flow diagram for a short-code application for the outbound roamers in accordance with an embodiment of the present invention.

Figure 13:
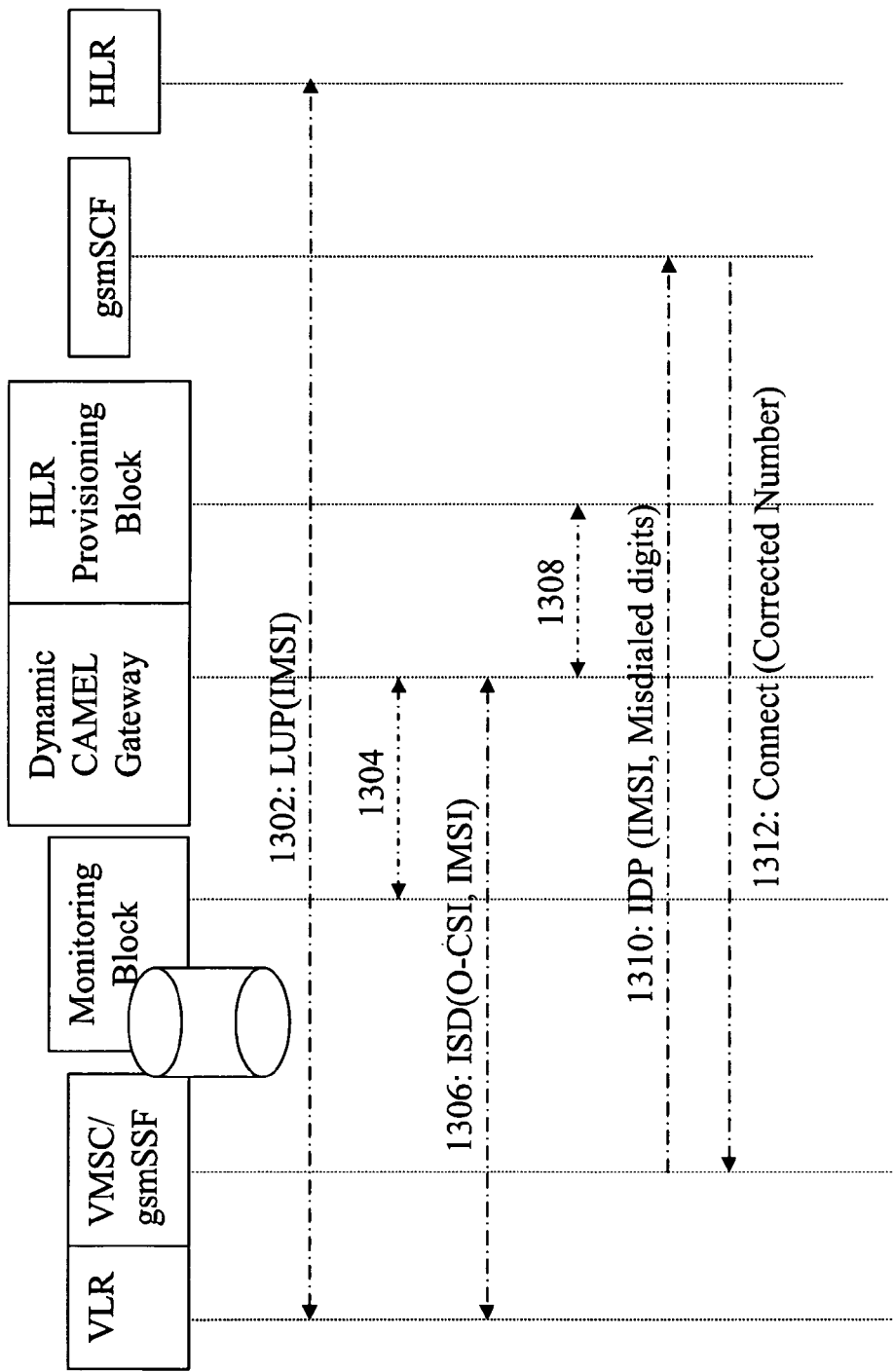

FIG. 13 illustrates a flow diagram for misdialed digits correction for the outbound roamers in accordance with an embodiment of the present invention.

Figure 14:
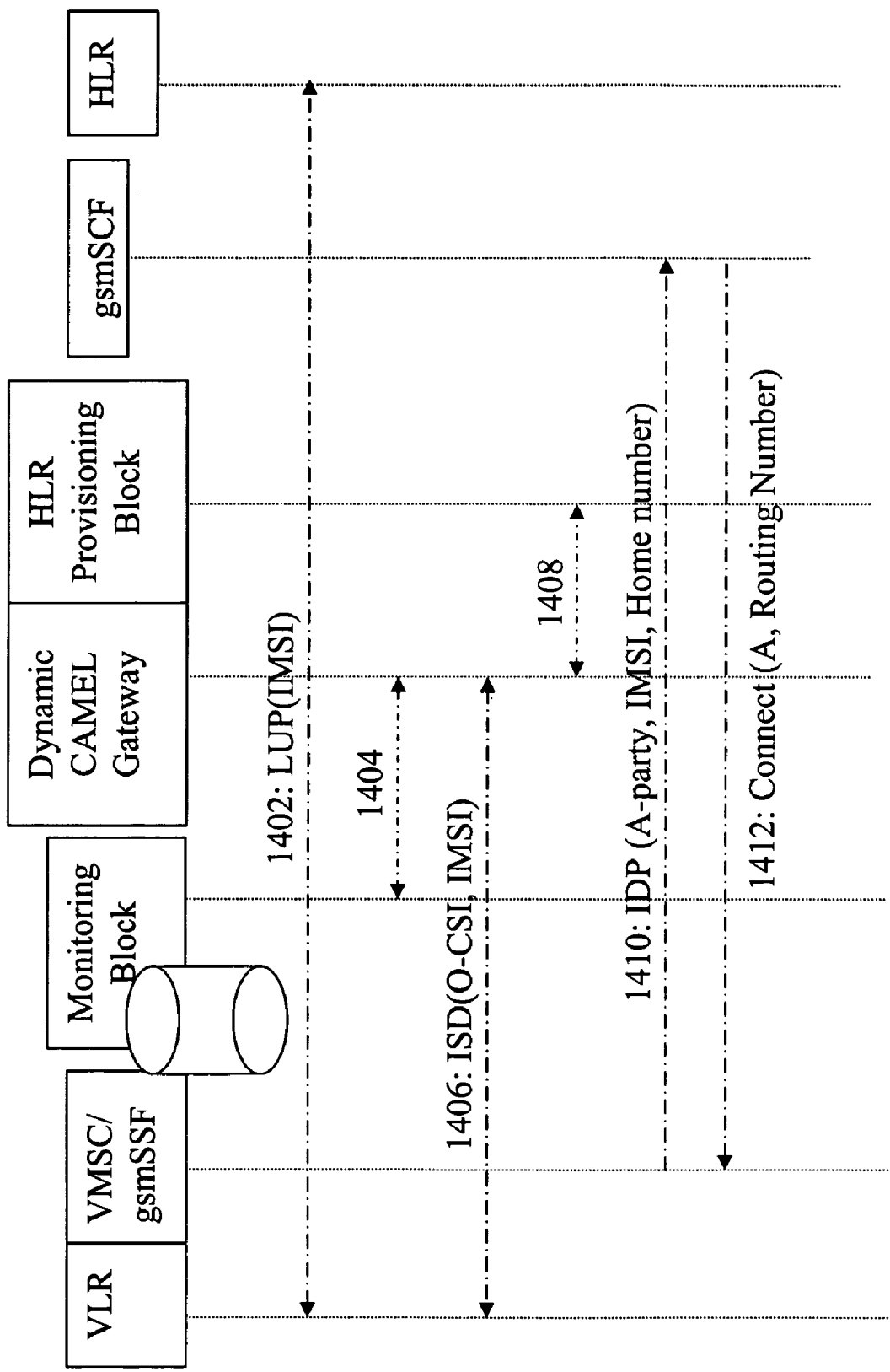

FIG. 14 illustrates a flow diagram for CLI guarantee for the outbound roamers in accordance with an embodiment of the present invention.

Figure 15:
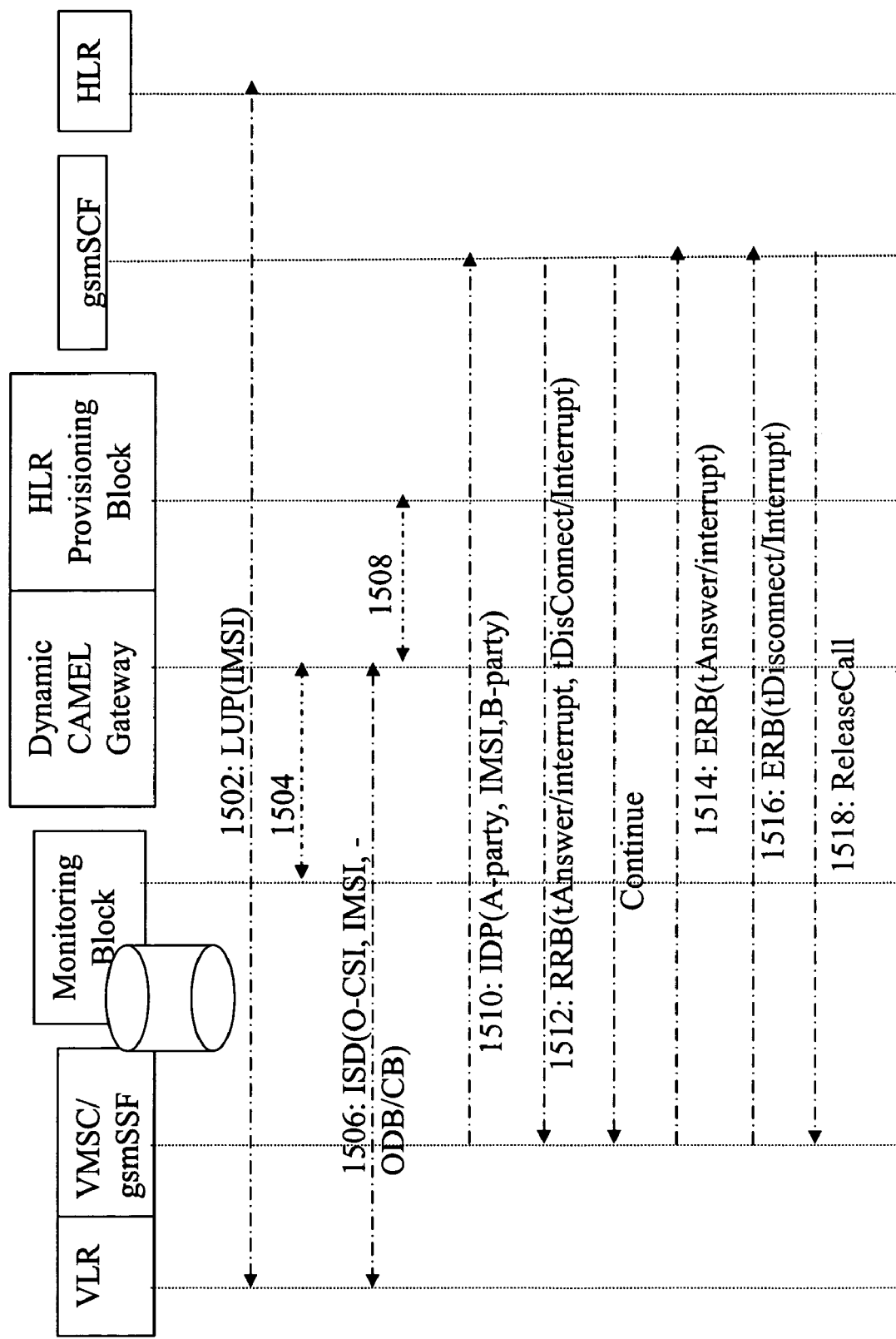

FIG. 15 illustrates a flow diagram for prepaid roaming for MO-call for the outbound roamers in accordance with an embodiment of the present invention.

Figure 16:
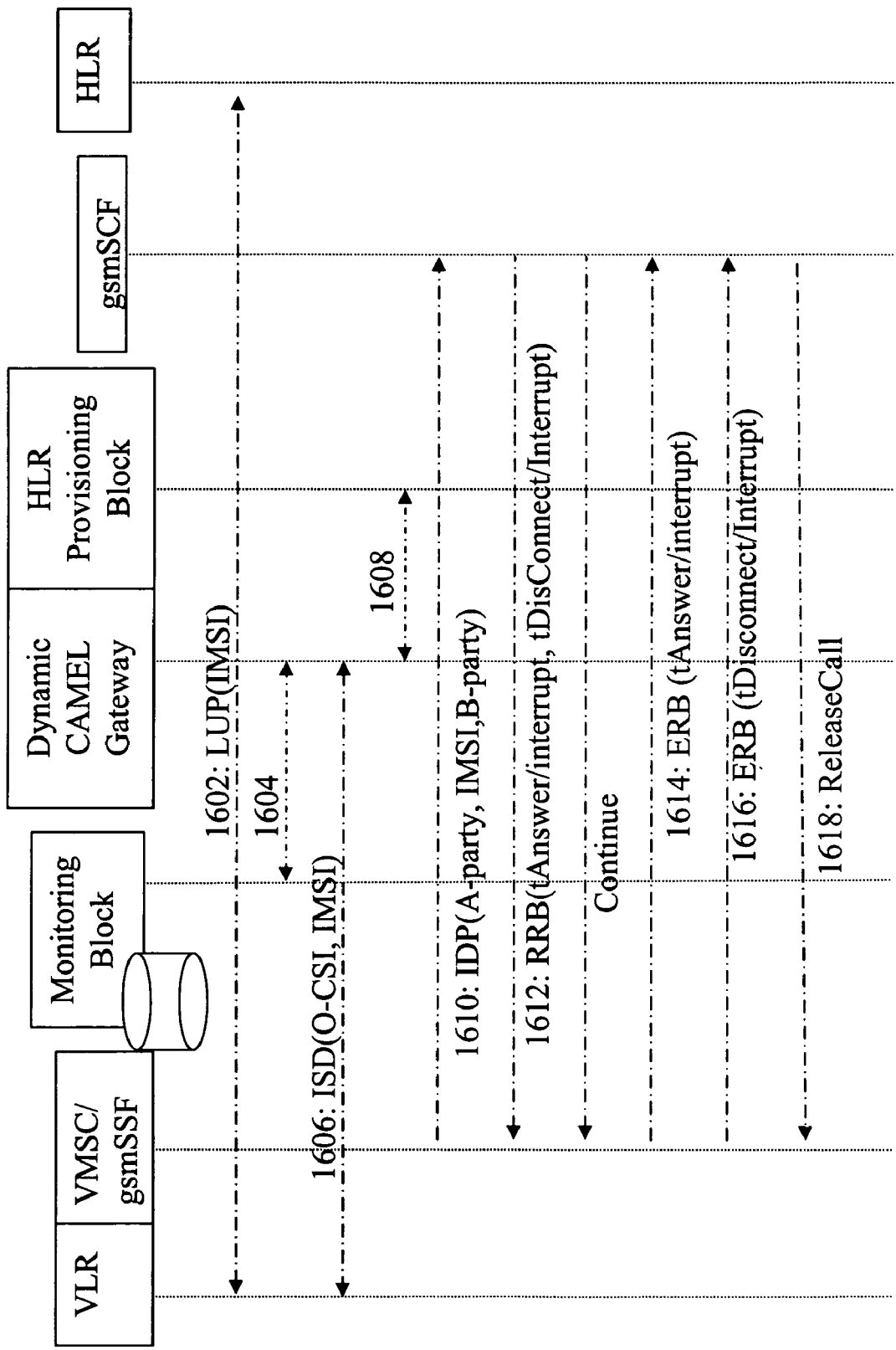

FIG. 16 illustrates a flow diagram for roaming fraud for the outbound roamers in accordance with an embodiment of the present invention.

Figure 17:
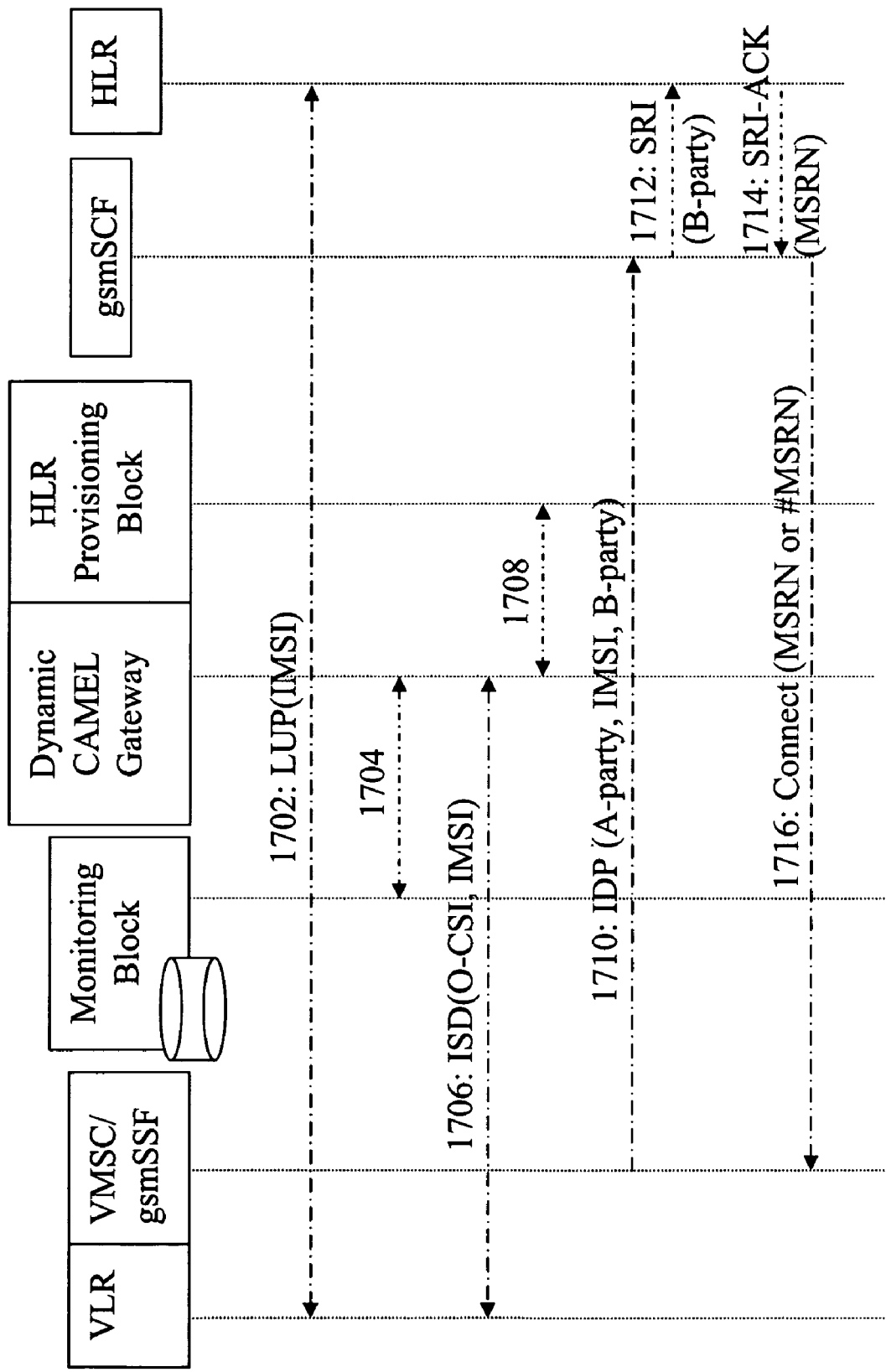

FIG. 17 illustrates a flow diagram for optimal routing for the outbound roamers in accordance with an embodiment of the present invention.

Figure 18:
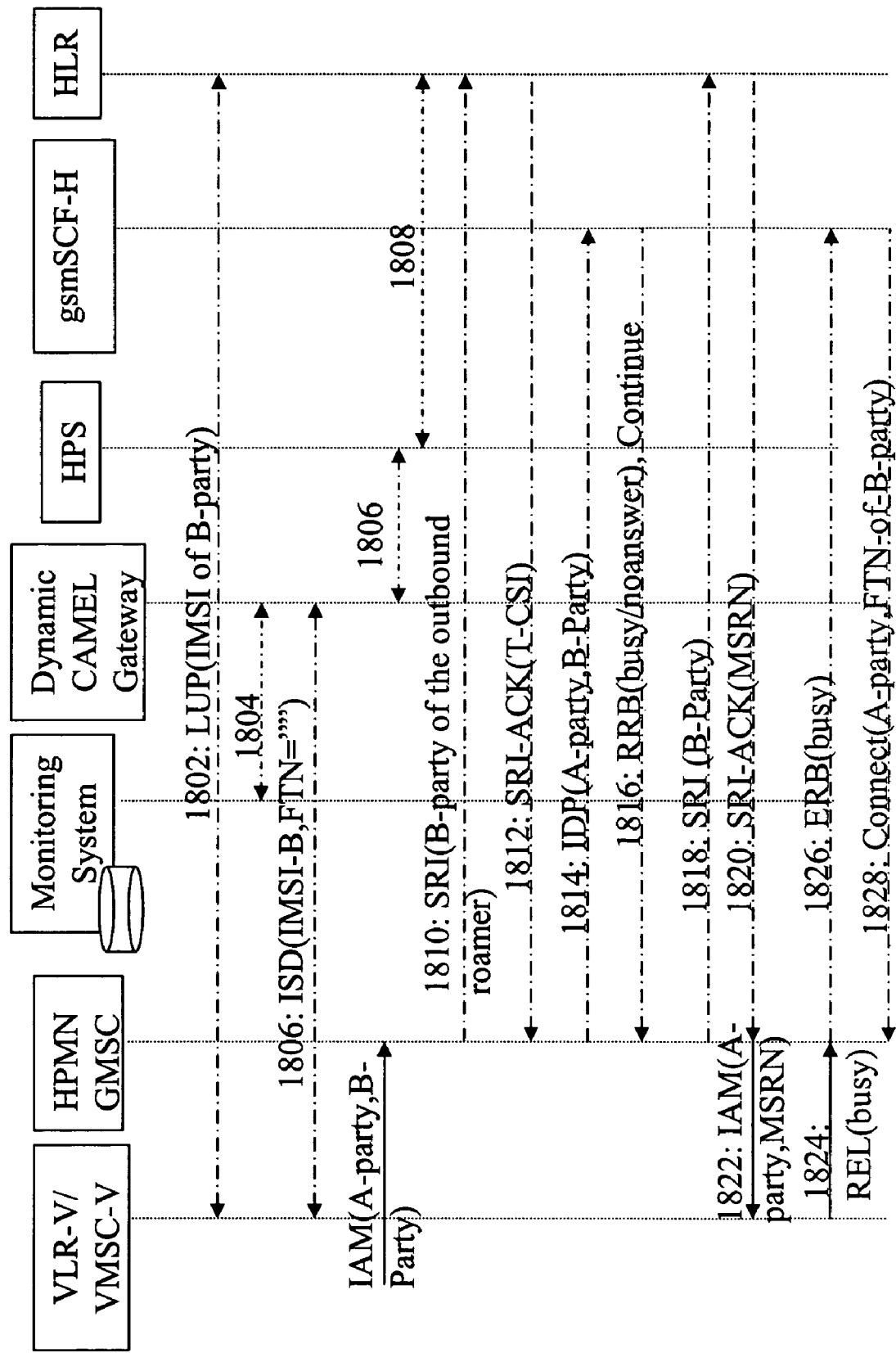

FIG. 18 illustrates a flow diagram for optimal routing on late call forwarding for the outbound roamers in accordance with an embodiment of the present invention.

Figure 19:
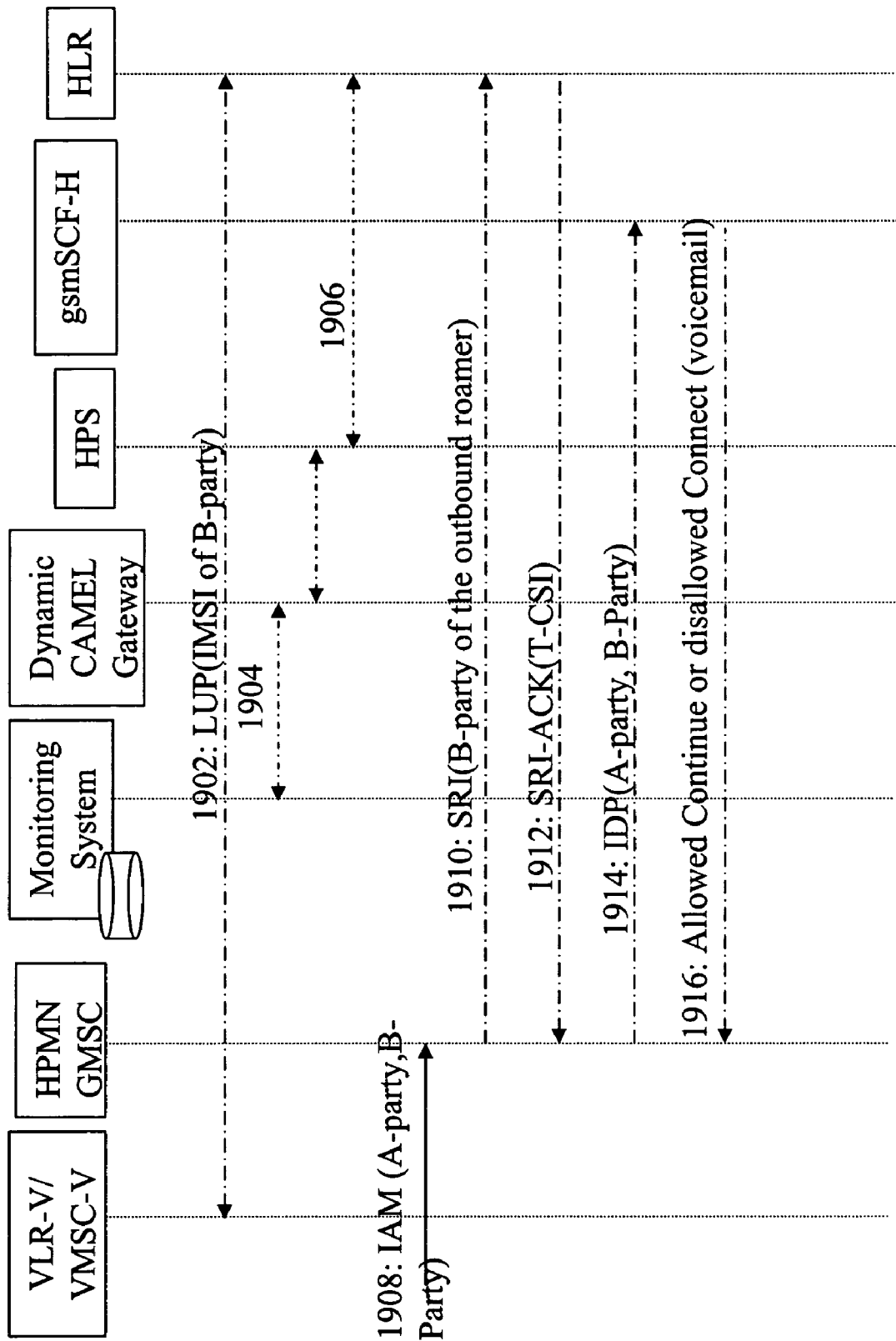

FIG. 19 illustrates a flow diagram for incoming call screening for the outbound roamers in accordance with an embodiment of the present invention.

Figure 20:
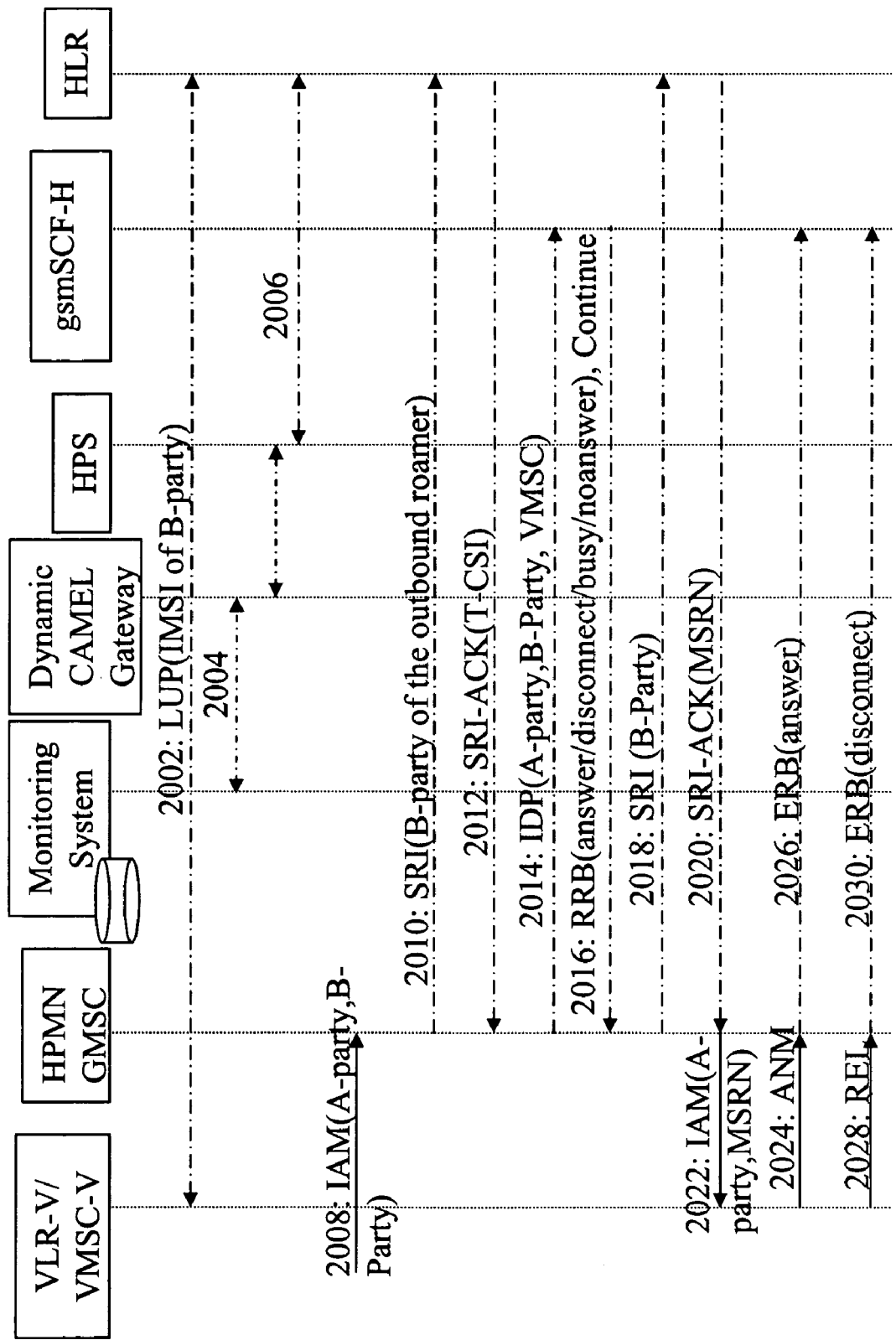

FIG. 20 illustrates a flow diagram for prepaid roaming for MT call for the outbound roamers in accordance with an embodiment of the present invention.

DETAILED DESCRIPTION OF THE INVENTION

The present invention provides a system for providing Customized Applications for Mobile network Enhanced Logic (CAMEL) Subscription Information (CSI) of an outbound roamer of a Home Public Mobile Network (HPMN) to at least one CSI storing node when the outbound roamer is roaming in a Visited Public Mobile Network (VPMN). The system comprises a roamers database storing an outbound roamer record of at least one outbound roamer, wherein the outbound roamer record comprises at least the International Mobile Subscriber Identity (IMSI) of the outbound roamer. The system further comprises a detection block to detect whether provisioning of the CSI is required for the outbound roamer and whether a CSI generation block to generate the CSI of the outbound roamer based on at least the IMSI of the outbound roamer, if the provisioning of the CSI is required. The system further comprises a provisioning block to provision the generated CSI of the outbound roamer to at least one CSI storing node. The CSI comprises a service key and an address of a Global System for Mobile communication (GSM) Service Control Function (SCF). Further, the CSI comprises at least one of a Mobile Originated (MO)-CSI and a Mobile Terminated (MT)-CSI.

In the foregoing description, the HPMN is a network where an outbound roamer is originally subscribed, while the VPMN is a network in which the outbound roamer is roaming.

FIG. 1 illustrates a block diagram of a system in accordance with an embodiment of the present invention. System 100 comprises HPMN 102 communicating with VPMN 104 via a SS7 interface 106. HPMN 102 comprises a monitoring block 108 coupled to a dynamic CAMEL gateway 110, an HPMN GMSC/STP 112, and an HPMN HLR 114. Dynamic CAMEL gateway 110 and HPMN HLR 114 are coupled to HPMN GMSC/STP 112. VPMN 104 comprises a VPMN STP 116 and a VPMN VLR/VMSC 118. HPMN GMSC/STP 112 communicates with VPMN STP 116 via SS7 interface 106. VPMN VLR/VMSC 118 is coupled to VPMN STP 116.

The interface between monitoring block 108 and dynamic CAMEL gateway 110 is either specially prepared using known techniques or standards, or the two elements can be from the same vendor using a vendor specific interface, or they may be available in a single device. In an embodiment of the present invention, that interface may be a TCP/IP based interface. Monitoring block 108 and dynamic CAMEL gateway 110 may belong to different vendors. A person skilled in the art will appreciate that monitoring block 108 and dynamic CAMEL gateway 110 may belong to the same vendor.

In accordance with an embodiment of the present invention, monitoring block 108, and dynamic CAMEL gateway 110 may be physically integrated in the same physical device. In accordance with another embodiment of the present invention, monitoring block 108, and dynamic CAMEL gateway 110 may be installed separately.

VPMN VLR/VMSC 118 sends a MAP transaction message 120 when the outbound roamer registers at VPMN VLR/VMSC 118. MAP transaction message 120 includes a MAP Location Update transaction. MAP transaction message 120 is forwarded to HPMN GMSC/STP 112. Monitoring block 108 taps international roaming links between SS7 interface 106 and HPMN GMSC/STP 112 via which MAP transaction message 120 is sent. Monitoring block 108 monitors MAP transaction message and informs dynamic CAMEL gateway 110 when it detects a successful MAP Location Update. Further, monitoring block 108 provides details of the outbound roamer to dynamic CAMEL gateway 110. The details provided by monitoring block 108 include at least an International Mobile Subscriber Identity (IMSI), the HPMN HLR, VLR/VMSC, a Mobile Station International ISDN Number (MSISDN), a supported CAMEL phase, and combination thereof.

Dynamic CAMEL gateway 110 generates CSI of the outbound roamer. In accordance with an embodiment of the present invention, the CSI comprises a service key and an address of a Global System for Mobile communication (GSM) Service Control Function (SCF). Further, the CSI comprises at least one of a Mobile Originated (MO)-CSI and a Mobile Terminated (MT)-CSI. Dynamic CAMEL gateway 110 provides the generated CSI to HPMN HLR 114 or VPMN VLR/VMSC 118 depending upon whether the generated CSI is a MT-CSI or a MO-CSI respectively. Dynamic CAMEL gateway 110 maintains records relating to at least one VPMN, CAMEL phases supported by the VPMN and at least one subscriber details. Dynamic CAMEL gateway 110 forwards the generated CSI 122 to HPMN GMSC/STP 112.

FIG. 2 illustrates a block diagram of dynamic CAMEL gateway 110 in accordance with an embodiment of the present invention. Dynamic CAMEL gateway 110 comprises a detection block 202, a CSI generation block 204, a provisioning block 206, and a roamers database 208. A CSI storing node 210 is coupled to provisioning block 206 via HPMN GMSC/STP 112. In an embodiment of the present invention, monitoring block 108 communicates with detection block 202 and roamers database 208 via Transmission Control Protocol (TCP)/Internet Protocol (IP).

Detection block 202 detects whether provisioning of the CSI is required for the outbound roamer, if monitoring block 108 communicates a successful MAP Location Update (LUP). Monitoring block 108 also provides details of the outbound roamer to roamers database 208 that stores an outbound roamer record of at least one outbound roamer, such the outbound roamer record comprises at least the International Mobile Subscriber Identity (IMSI) of the outbound roamer. Additionally, the outbound roamer record includes the HPMN HLR, VLR/VMSC, a Mobile Station International ISDN Number (MSISDN), a supported CAMEL phase, and combination thereof. Additionally, detection block 202 identifies whether the CSI for the outbound roamer is defined at CSI storing node 210 in response to the successful MAP Location Update (LUP) from the outbound roamer. Detection block 202 also detects whether the CSI defined at CSI storing node 210 conforms to the CAMEL phase supported by CSI storing node 210. For example, it checks whether HPMN HLR 114 has sent the required MO-CSI to VPMN VLR/VMSC 118 or whether HPMN HLR 114 has the required MT-CSI.

CSI generation block 204 generates the CSI of the outbound roamer based on at least the IMSI of the outbound roamer, if the provisioning of the CSI is required as communicated by detection block 202. CSI generation block 204 retrieves IMSI of the outbound roamer stored in the outbound roamer record of roamers database 208.

Provisioning block 206 provides the generated CSI of the outbound roamer to at least one CSI storing node 210. CSI storing node 210 comprises at least one of HPMN HLR 114 and VPMN VLR/VMSC 118. Provisioning block 206 provisions MO-CSI to VPMN VLR/VMSC 118 while it provisions MT-CSI to HPMN HLR 114.

FIG. 3 illustrates a block diagram of dynamic CAMEL gateway 110 in accordance with another embodiment of the present invention. In addition to the blocks described in FIG. 2, dynamic CAMEL gateway 110 further includes a CAMEL support identification block 302 coupled to CSI generation block 204 and detection block 202. CAMEL support identification block 302 maintains a CAMEL support database 304 for storing information of the CAMEL phases supported by at least one VPMN. CSI generation block 204 also maintains a database of mapping of at least one IMSI range to a corresponding HLR Global Title (GT) of the outbound roamer. The HLR GT assigned to dynamic CAMEL gateway 110 has the same prefix as the HPMN HLR GT.

Before CSI generation block 204 generates the MO-CSI, CAMEL support identification block 302 checks whether CAMEL is supported by VPMN 104 of the outbound roamer and identifies the phase of CAMEL supported by VPMN 104 by using the information of the CAMEL phases stored in CAMEL support database 304. CSI generation block 204 generates the MO-CSI using the information of the CAMEL phases stored in CAMEL Support Database (CSD) 304. It will be apparent to one skilled in the art that CAMEL support identification block 302 may employ various techniques to identify the phase of CAMEL supported by VPMN 104, without deviating from the spirit and scope of the present invention. For example, monitoring block 108 may check CAMEL phases supported by the VPMN in addition to monitoring successful location update transaction of the outbound roamer with the VPMN.

The MO-CSI contains only O-CSI, if CAMEL support identification block 302 identifies VPMN 104 to support CAMEL phase 1.

The MO-CSI contains at least one of O-CSI, SS-CSI and TIF-CSI, if CAMEL support identification block 302 identifies VPMN 104 to support CAMEL phase 2. In CAMEL phase 2, TDP-Criteria for the O-CSI may be associated with the O-CSI.

The MO-CSI contains at least one of O-CSI, D-CSI, SS-CSI, VT-CSI, SMS-CSI, M-CSI, GPRS-CSI, and TIF-CSI, if CAMEL support identification block 302 identifies VPMN 104 to support CAMEL phase 3. In CAMEL Phase 3, additionally, TDP-Criteria for the VT-CSI may be associated with the VT-CSI. Although the present invention is described using GSM network, it is applicable to other wireless networks including GPRS and WIN-based CDMA. First two phases of CAMEL are supported by GSM only while phase 3 and plus are supported by GSM and GPRS. The MO-CSI for phase 3 of CAMEL includes GPRS-CSI and TDP-Criteria for the GPRS-CSI. The VLR (or GPRS SGSN) bound MO-CSI is sent after MAP location update or when any information in the applicable MO-CSI in HPMN HLR 114 has been changed.

For provisioning MO-CSI, the record of MO-CSI (VLR or SGSN) is sent in one dialogue after a successful location update (including GPRS). In accordance with an embodiment of the present invention, the MO-CSI generated by CSI generation block 204 is provisioned at CSI storing node 210. CSI storing node 210 comprises VPMN VLR/VMSC 118. To provision MO-CSI at VPMN VLR/VMSC 118, provisioning block 206 sends a stand-alone MAP Insert Subscriber Data (ISD) to VPMN VLR/VMSC 118 containing a record of MO-CSI of the outbound roamer. In accordance with an embodiment of the present invention, the record of MO-CSI includes an IMSI and the MO-CSI or a set of MO-CSIs corresponding to the phase supported by VPMN 104 of the outbound roamer.

The GT of dynamic CAMEL gateway 110 has the same prefix as the GT of HPMN HLR 114 when it sends the MAP ISD. Dynamic CAMEL gateway 110 selects the HLR GT with the same prefixes as the HPMN HLR GT corresponding to the IMSI of the outbound roamer to avoid discrepancy if VPMN VLR/VMSC 118 checks the prefix of the stored HPMN HLR GT against the HLR GT of dynamic CAMEL gateway 110.

It may be seen that in this embodiment, no change need be made to HPMN HLR 114 as provisioning of MO-CSI at HPMN HLR 114 is not required and therefore no license cost is incurred by the operator. Further, if monitoring block 108 or dynamic CAMEL gateway 110 is not functional, HPMN HLR 114 is not affected. Hence, when the outbound roamer returns to HPMN HLR 114, it is not required to remove the roaming MO-CSI of the outbound roamer at HPMN HLR 114.

Further, in any CAMEL phase, if HPMN HLR 114 has already sent a MO-CSI (e.g. O-CSI, SS-CSI, VT-CSI), dynamic CAMEL gateway 110 does not send additional MO-CSI of the same type since the VLR CAMEL interaction with the HPMN SCP via the same type of MO-CSI can be relayed through dynamic CAMEL gateway 110 to the HPMN SCP.

If the VLR/SGSN MO-CSI is omitted in the MAP ISD operation, VPMN VLR/VMSC 118 shall keep the previously stored VLR/SGSN MO-CSI. Within one dialogue, subsequent received data is interpreted as add-on data. If VPMN VLR/VMSC 118 detects overlapping in the information received within a dialogue, it sends an error for example, Unexpected Data Value.

It will be apparent to a person skilled in the art that various blocks disclosed in conjunction with the disclosed embodiments of the present invention are logically unique entities. One or more of these blocks may be implemented on a single network node, without deviating from the spirit and scope of the present invention. Further, the functions performed by two or more of these blocks may be merged in to a single program code for implementation on a network node. Various implementations imbibing the teachings of the present invention will be apparent to one skilled in the art. All these implementation are deemed to lie within the spirit and scope of the present invention.

FIG. 4 illustrates a block diagram of dynamic CAMEL gateway 110 in accordance with yet another embodiment of the present invention. An HLR provisioning block 402 is coupled to dynamic CAMEL gateway 110, which in turn is connected to HPMN HLR 114. The interface between HLR provisioning block 402 and dynamic CAMEL gateway 110 may either be specially prepared using known techniques or standards, or the two elements can be from the same vendor using a vendor specific interface, or they may be available in a single device in various embodiments of the present invention. In an embodiment of the present invention, the interface may be a TCP/IP based interface. The interface between HLR provisioning block 402 and HPMN HLR 114 is also proprietary and may be defined by the HLR vendor.

Provisioning block 206 provisions both MO-CSI and MT-CSI generated by CSI generation block 204. Various embodiments for provisioning MO-CSI and MT-CSI via HLR provisioning block 402 are described in the following description.

In accordance with an embodiment of the present invention, to provision MO-CSI at VPMN VLR/VMSC 118, provisioning block 206 instructs HLR provisioning block 402 to provision a record of MO-CSI of the outbound roamer to HPMN HLR 114. In accordance with an embodiment of the present invention, the record of MO-CSI includes the IMSI and the MO-CSI or a set of MO-CSIs of the outbound roamer in accordance with the phase supported by VPMN 104. HPMN HLR 114 in turn sends a stand-alone MAP ISD to VPMN VLR/VMSC 118 containing the MO-CSI. The record of MO-CSI provisioned HLR provisioning block 402 at HPMN HLR 114 is subsequently de-provisioned once the outbound roamer returns to HPMN 102, or upon timeout of the record of MO-CSI, or upon purging by VPMN VLR/VMSC 118.

In this embodiment, there is no restriction on the GT of dynamic CAMEL gateway 110. This embodiment is advantageous if VPMN VLR/VMSC 118 checks GT of the issuer of MAP ISD against the full HPMN HLR 114. In this case, a MAP ISD issued by dynamic CAMEL gateway 110 may not be accepted by VPMN VLR/VMSC 118. However, since HPMN HLR 114 issues the MAP ISD, it can be employed even when VPMN VLRNMSC 118 checks the full GT of the issuer of the MAP ISD. Dynamic CAMEL gateway 110 does not send subsequent stand-alone MAP ISD each time a new location update if the outbound roamer is received as the CSI record of the outbound roamer is modified when the successful location update is received for the first time. However, HPMN HLR 114 has to send the stand-alone MAP ISD with the CSI parameter as part of the location update transaction. In addition, if a new location update indicates a different CAMEL phase support, depending on application requirements, dynamic CAMEL gateway 110 may update the HLR CSI provisioning by interfacing HLR provisioning block 402. Further, dynamic CAMEL gateway 110 does not send the complete record of the stand-alone MAP ISD messages in CAMEL Phase 1 and 2.

In an embodiment of the present invention, the complete record of VLR MO-CSI for CAMEL phase 1 and CAMEL phase 2, is sent in one dialogue with MAP ISD command while for CAMEL phase 3, one or more specific elements of VLR/SGSN MO-CSI are sent in one dialogue. When the VLR/SGSN receives a specific element of VLR/SGSN MO-CSI, it overwrites the corresponding specific element of VLR/SGSN MO-CSI (if any) stored in its database for a particular subscriber.

In the stand-alone MAP ISD, provisioning block 206 sends the record of the first group of MO-CSI in one dialogue for CAMEL phase 1 and CAMEL phase 2. The record consists of one or more of O-CSI (irrespective of the value of the "CAMEL Capability Handling" inside O-CSI), TDP-Criteria for O-CSI, SS-CSI and TIF-CSI. VPMN VLRNMSC 118 deletes any old record present in its database and stores the MO-CSI received with MAP ISD command. However, if any element (e.g. SS-CSI) in the record of MO-CSI changes, provisioning block 206 sends the record of MO-CSI again.

For example, if HPMN HLR 114 has already sent the MO-CSI (e.g. O-CSI) while the dynamic CAMEL gateway 110 has to send other MO-CSI (e.g. SS-CSI), dynamic CAMEL gateway 110 will record the MO-CSI sent by HPMN HLR 114 during monitoring and resend the MO-CSI sent by HPMN HLR 114 together with the MO-CSI created by CSI generation block 204. VPMN VLRNMSC 118 deletes the omitted elements of above list on receipt of MO-CSI with the MAP ISD.

In the stand-alone MAP ISD, provisioning block 206 sends the record of the first group of MO-CSI in one dialogue for CAMEL phase 3 and plus. The record consists of one or more of O-CSI (irrespective of the value of the "CAMEL Capability Handling" inside O-CSI), TDP-Criteria for O-CSI, SS-CSI and TIF-CSI for the first group. VPMN VLR/VMSC 118 deletes any old record present in its database and stores the MO-CSI received with MAP ISD command. However, if any element (e.g. SS-CSI) in the record of MO-CSI changes, provisioning block 206 sends the record of MO-CSI again. For CAMEL phase 3 and plus, the record of the second group of MO-CSI additionally contains D-CSI, VT-CSI, TDP-Criteria for VT-CSI, SMS-CSI, and a M-CSI.

Thus, for the first group of MO-CSI of CAMEL phase 3, the dynamic CAMEL gateway 110 records HPMN HLR 114 sent MO-CSI information and resends it together with MO-CSI. However, for other MO-CSI elements, dynamic CAMEL gateway 110 can send them independently.

From CAMEL phase 3 onwards, the record of GPRS MO-CSI to be sent include GPRS-CSI, and TDP Criteria for GPRS-CSI. A complete record of the GPRS MO-CSI is sent if only one GPRS-CSI is changed. The omitted elements of above record are deleted from the SGSN.

In either embodiment, the default phase of CAMEL support at VPMN 104 is one. The actual MO-CSI sent to VPMN VLRNMSC 118 or requested to HLR provisioning block 402 depends on the HPMN application requirements.

A person skilled in the art will appreciate that dynamic CAMEL gateway 110 for MO-CSI is useful to operators with or without CAMEL support for MO calls, since it is required that VPMN 104 should support while HPMN 102 may or may not support CAMEL.

Further, in various embodiments, dynamic CAMEL gateway 110 provisions MT-CSI for the outbound roamer.

In accordance with an embodiment of the present invention, CAMEL gateway 110 provisions MT-CSI at HPMN HLR 114 via HLR provisioning block 402. After a successful location update of the outbound roamer, provisioning block 206 instructs HLR provisioning block 402 to provision a record of MT-CSI at HPMN HLR 114. The record of MT-CSI includes the IMSI, and the MT-CSI. HLR provisioning block 402 de-provisions the earlier provisioned MT-CSI at HPMN HLR 114 if the outbound roamer registers at the HPMN or is timeout by the HPMN or is purged by the current VPMN VLRNMSC 118. Thus, GT translation at the SCCP layer of HPMN GMSC/STP 112 on HPMN MSISDN E164 routing is not required. However, it requires the support of MT-CSI by HPMN HLR 114 and HLR provisioning block 402.

FIG. 5 illustrates a block diagram of system for provisioning MT-CSI at HPMN GMSC/STP 112 in accordance with an embodiment of the present invention. When HPMN GMSC/STP 112 issues SRI (without CAMEL suppressed) to HPMN HLR 114 on HPMN MSISDN E164, dynamic CAMEL gateway 110 intercepts the SRI issued by HPMN GMSC/STP 112. Provisioning block 206 of dynamic CAMEL gateway 110 returns the MT-CSI information to HPMN GMSC/STP 112. HPMN GMSC/STP 112 utilizes the MT-CSI to route the MT calls directed to the outbound roamer. When dynamic CAMEL gateway 110 issues its response to MT-CSI, it may utilize a fake HPMN HLR GT or the same E164 MSISDN address as the HPMN HLR address providing routing configuration for a certain translation type to route the SRI query through the dynamic CAMEL gateway 110. However, if HPMN GMSC/STP 112 issues SRI (with CAMEL suppressed), it is relayed to HPMN HLR 114. The SRI messages may be rerouted through dynamic CAMEL gateway 110 using a protocol including a translation type, a Message Transfer Part (MTP) level point code routing and HLR mapping.

It may be seen that in this embodiment, no change is done to HPMN HLR 114 as HPMN HLR 114 provisioning of MT-CSI is not required and therefore no license cost is incurred. Further, if monitoring block 108 or dynamic CAMEL gateway 110 is not functional, HPMN HLR 114 is not affected. Hence, when the outbound roamer re-registers to HPMN 102, the outbound roamer does not need to remove the roaming MT-CSI at HPMN HLR 114. However, dynamic CAMEL gateway 110 redirects all SCCP messages on HPMN MSISDN E164.

FIG. 6 illustrates a flowchart for providing CSI of the outbound roamer in accordance with an embodiment of the present invention. At step 602, an outbound roamer record of at least one outbound roamer is maintained. The outbound roamer record comprises at least the International Mobile Subscriber Identity (IMSI) of the outbound roamer. Additionally, the outbound roamer record includes the HPMN HLR, VLR/VMSC, a Mobile Station International ISDN Number (MSISDN), a supported CAMEL phase, and combination thereof.

At step 604, it is detected whether provisioning of the CSI is required for the outbound roamer in response to the successful MAP location update. Also, a check is done to identify whether the CSI for the outbound roamer is defined at the CSI storing node. The check determines whether the HPMN HLR has sent the required MO-CSI to the VPMN VLR/VMSC or whether the HPMN HLR has the required MT-CSI. At step 606, the CSI of the outbound roamer is generated based on the outbound roamer record, if the provisioning of the CSI is required. At step 608, the generated CSI of the outbound roamer is provided to at least one CSI storing node. The generated CSI include MO-CSI and MT-CSI.

FIG. 7 illustrates a flowchart for generation of the MO-CSI in accordance with an embodiment of the present invention. When an outbound roamer registers with the VPMN VLR/VMSC, the MAP transaction message is sent by the VPMN VLR/VMSC to the HPMN HLR. The MAP transaction message, for example location update, is monitored at step 702. At step 704, at least one outbound roamer record is stored from the monitored transactions. The outbound roamer record contains at least the IMSI of the outbound roamer. Additionally, the outbound roamer record includes the HPMN HLR, VLR/VMSC, a Mobile Station International ISDN Number (MSISDN), a supported CAMEL phase, and combination thereof.

Next, it is determined whether the location update is successful and whether provisioning of the MO-CSI is required for the outbound roamer at the VPMN VLR/VMSC at step 706. Further, it is determined whether the VPMN supports CAMEL and whether the MO-CSI defined at the VPMN VLR/VMSC conforms to the CAMEL phase supported by the VPMN VLR/VMSC. The CAMEL phase supported by the VPMN is determined at step 708. If the conditions in step 706 are true, the MO-CSI is generated according to the CAMEL phase supported by the VPMN at step 710. The generation of MO-CSI is described in FIG. 3. At step 712, the generated MO-CSI is provisioned at the VPMN VLR/VMSC.

FIG. 8 illustrates a flowchart for provisioning the generated MO-CSI at the VPMN VLR/VMSC in accordance with an embodiment of the present invention. The generated MO-CSI is provisioned to the VPMN VLR/VMSC by issuing the MAP ISD command with generated MO-CSI at step 802. The GT of the dynamic CAMEL gateway in the MAP ISD has the same prefix as the HPMN HLR GT. At step 804, a check is made to determine whether the MAP ISD is successful. If the MAP ISD is not successful, for example when the GT of the dynamic CAMEL gateway does not match the GT of the HPMN HLR, provisioning of the generated MO-CSI can be accomplished using an alternate approach. In the alternate approach, the HLR provisioning block is provided with the generated MO-CSI at step 806. The HLR provisioning block is instructed to provision the MO-CSI record at the HPMN HLR at step 808. At step 810, the HPMN HLR is triggered to issue MAP ISD to provision the MO-CSI at the VPMN VLRNMSC. It will be apparent to a person skilled in the art that the aforesaid approaches can be used independently to provision MO-CSI at the VPMN VLRNMSC.

FIG. 9 illustrates a flowchart for generation of MT-CSI in accordance with an embodiment of the present invention. When an outbound roamer registers with the VPMN VLR/VMSC, the MAP transaction message is sent by the VPMN VLR/VMSC to the HPMN HLR. The MAP transaction message, for example location update, is monitored at step 902. At step 904, at least one outbound roamer record is stored from the monitored transactions. The monitored roamer record contains at least the IMSI of the outbound roamer. Additionally, the outbound roamer record includes the HPMN HLR, VLR/VMSC, a Mobile Station International ISDN Number (MSISDN), a supported CAMEL phase, and combination thereof.

Next, it is determined whether the location update is successful and whether provisioning of the MT-CSI is required for the outbound roamer at the HPMN HLR at step 906. If the conditions in step 906 are true, the MT-CSI is generated based on the IMSI of the outbound roamer at step 908. The generation of MT-CSI is described in FIG. 3. At step 910, the generated MT-CSI is provisioned at the HPMN/HLR.

FIG. 10 illustrates a flowchart for provisioning the generated MT-CSI at the HPMN GMSC/STP in accordance with an embodiment of the present invention. A SRI (without CAMEL suppressed) command issued to the HPMN HLR on the HPMN MSISDN E164 by the HPMN GMSC/STP is intercepted by the dynamic CAMEL gateway at step 1002. The SRI is redirected with the MT-CSI information to the HPMN GMSC/STP at step 1004. The SRI messages can be rerouted using a protocol selected from a group including a translation type, a Message Transfer Part (MTP) level point code routing and HLR mapping. The MT calls to the outbound roamer are routed by the HPMN GMSC/STP utilizes the MT-CSI record. However, if the SRI (with CAMEL suppressed) is issued by the HPMN GMSC/STP, it is relayed to the HPMN HLR.

FIG. 11 illustrates a flowchart for provisioning the generated MT-CSI at the HPMN HLR in accordance with another embodiment of the present invention. The HLR provisioning block is provided with the generated MT-CSI at step 1102. The HLR provisioning block provisions the MT-CSI record at the HPMN HLR at step 1104.

The foregoing description describes some of the applications for controlling MO-calls of the outbound roamers using the present invention.

FIG. 12 illustrates a flow diagram for a short-code application for the outbound roamers in accordance with an embodiment of the present invention. After detecting a successful location update at the CAMEL supporting the VPMN of the outbound roamer of certain class (e.g. postpaid) at step 1202, the monitoring block provides the IMSI of the outbound roamer to the Dynamic CAMEL gateway at step 1204. The Dynamic CAMEL gateway provides the MO-CSI to the VLR of the outbound roamer either by sending a stand-alone MAP ISD containing the MO-CSI and IMSI to the VLR at step 1206 or by triggering the HPMN HLR to send a stand-alone MAP ISD via the HLR provisioning block at step 1208.

The O-CSI for VPMN CAMEL phase 1 is empty. The O-CSI for VPMN CAMEL phase 2 and above contains the following TDP criteria "The length of the dialed digits is less or equal than X (e.g. 6)"

When the outbound roamer makes a short-code call, a VPMN gsmSSF transfers the call control via a CAP IDP containing the IMSI and the short-code to the HPMN gsmSCF at step 1210. The HPMN gsmSCF checks a database containing translated long numbers corresponding to the short-code and returns the translated long number via a CAP Connect command at step 1212.

However, if the outbound roamer is already equipped with an O-CSI, it can be handled via CAP relay through a CAP relay proxy back to the HPMN gsmSCF.

FIG. 13 illustrates a flow diagram for misdialed digits correction for the outbound roamers in accordance with an embodiment of the present invention. After detecting a successful location update at the CAMEL supporting the VPMN of the outbound roamer of certain class (e.g. postpaid) at step 1302, the monitoring block provides the IMSI of the outbound roamer to the Dynamic CAMEL gateway at step 1304. The Dynamic CAMEL gateway provides the MO-CSI to the VLR of the outbound roamer either by sending a stand-alone MAP ISD containing the MO-CSI and IMSI to the VLR at step 1306 or by triggering the HPMN HLR to send a stand-alone MAP ISD via the HLR provisioning block at step 1308.

The O-CSI for the VPMN CAMEL phase 1 is empty. The O-CSI for the VPMN CAMEL phase 2 and above contains the following TDP criteria
1. "The dialed digits are not routable" for CAMEL Phase 3
2. "The prefix of the dialed digits is HPMN IDD prefix" for CAMEL phase 2 and above
3. "The prefix of the dialed digits is HPMN CC NDC prefix and the number is not an international number" for CAMEL phase 2 and above.

When the outbound roamer makes a misdialed digit call, the VPMN gsmSSF transfers the call control via a CAP IDP containing the IMSI and misdialed digits to the HPMN gsmSCF at step 1310. The HPMN gsmSCF returns a CAP Connect command containing the corrected number to the VPMN gsmSSF at step 1312.

FIG. 14 illustrates a flow diagram for CLI guarantee for the outbound roamers in accordance with an embodiment of the present invention. After detecting a successful location update at the CAMEL supporting the VPMN of the outbound roamer of certain class (e.g. postpaid) at step 1402, the monitoring block provides the IMSI of the outbound roamer to the Dynamic CAMEL gateway at step 1404. The Dynamic CAMEL gateway provides the MO-CSI to the VLR of the outbound roamer either by sending a stand-alone MAP ISD containing the MO-CSI and IMSI to the VLR at step 1406 or by triggering the HPMN HLR to send a stand-alone MAP ISD via the HLR provisioning block at step 1408.

The O-CSI for the VPMN CAMEL phase 1 is empty. The O-CSI for the VPMN CAMEL phase 2 and above contains the following TDP criteria
1. "The prefix of the dialed digits is HPMN CC NDC"
2. "The prefix of the dialed digits is HPMN IDD prefix and HPMN CC NDC"
3. "The prefix of the dialed digits is VPMN IDD prefix and HPMN CC NDC"

When the outbound roamer makes a HPMN international call, the VPMN gsmSSF transfers the call control via a CAP IDP containing the calling party number, the IMSI and a home number to the HPMN gsmSCF at step 1410. The HPMN gsmSCF obtains caller ID and returns a routing number via a CAP Connect command at step 1412. The call made by the outbound roamer is routed via the routing number to the HPMN and the HPMN gsmSCF substitutes the original IN called party and the original calling party.

However, if the outbound roamer is already equipped with an O-CSI, it may be handled via a CAP relay through the value added local service node back to the HPMN gsmSCF.

FIG. 15 illustrates a flow diagram for prepaid roaming for MO-call for the outbound roamers in accordance with an embodiment of the present invention. Normally, for roaming, a prepaid roamer, by default, either has ODB or Call Barring (CB) for the outbound call set at the HPMN HLR. In non-CAMEL network, the prepaid roamer can use USSD or SMS call back to activate the outbound call facility. However, when the prepaid roamer registers with a CAMEL-based VPMN, the Dynamic CAMEL gateway disables ODB/CB outbound call restrictions at the VPMN VLRNMSC.

After detecting a successful location update at the CAMEL supporting VPMN of the outbound roamer of certain class (e.g. prepaid) at step 1502, the monitoring block provides the IMSI of the outbound roamer to the Dynamic CAMEL gateway at step 1504. The Dynamic CAMEL gateway provides the MO-CSI to the VLR of the outbound roamer either by sending a stand-alone MAP ISD containing the MO-CSI and IMSI with disabled outbound call ODB/CB restriction to the VLR at step 1506 or by triggering the HPMN HLR to send a stand-alone MAP ISD via the HLR provisioning block at step 1508. The O-CSI for any VPMN CAMEL phase is empty.

When the outbound roamer makes a HPMN international call, the VPMN gsmSSF transfers the call control via a CAP IDP containing calling party number, the IMSI and a called party number to the HPMN gsmSCF at step 1510. The HPMN gsmSCF returns a routing number. The HPMN gsmSCF sends Request Report Basic call state monitoring (RRB) including answer/interrupt event and disconnect/interrupt event at step 1512. When the call is routed via the routing number to the HPMN, the HPMN gsmSCF may use ERB answer/interrupt command to monitor and start accounting the call or interrupt the call if balance is reached at step 1514. The HPMN gsmSCF may use ERB disconnect/interrupt command to disconnect and end accounting or interrupt the call if balance is reached or exhausted at step 1516. The HPMN gsmSCF releases the call at step 1518.

FIG. 16 illustrates a flow diagram for roaming fraud for the outbound roamers in accordance with an embodiment of the present invention. After detecting a successful location update at the CAMEL supporting the VPMN of the outbound roamer of certain class (e.g. postpaid or prepaid) at step 1602, the monitoring block provides the IMSI of the outbound roamer to the Dynamic CAMEL gateway at step 1604. The Dynamic CAMEL gateway provides the MO-CSI to the VLR of the outbound roamer either by sending a stand-alone MAP ISD containing the MO-CSI and IMSI to the VLR at step 1606 or by triggering the HPMN HLR to send a stand-alone MAP ISD via the HLR provisioning block at step 1608. The O-CSI for any CAMEL phase will be empty.

When the outbound roamer makes a HPMN international call, the VPMN gsmSSF transfers the call control via a CAP IDP containing the calling party number, the IMSI and the called party number to the HPMN gsmSCF at step 1610. The HPMN gsmSCF returns a routing number. The HPMN gsmSCF sends Request Report Basic call state machine (RRB) including answer/interrupt event and disconnect/interrupt event at step 1612. When the call is routed via the routing number to the HPMN, the HPMN gsmSCF may use ERB answer/interrupt to monitor and start statistical analysis (for example, duration or frequency or suspect location) of the call or interrupt the call at step 1614. The HPMN gsmSCF may use ERB disconnect/interrupt to disconnect and end the statistical analysis or interrupt the call at step 1616. The HPMN gsmSCF releases the call at step 1618.

FIG. 17 illustrates a flow diagram for optimal routing for the outbound roamers in accordance with an embodiment of the present invention. Optimal routing is currently deployed by the VPMN of inbound roamers. It allows an inbound roamer or local to call another inbound roamer within the same PLMN. In some regions, this is cost effective. In other regions, this might not be cost-effective since the VPMN might lose terminating interconnection fee. If the HPMN provides a flat rate roaming fee for a region, the optimal routing is not beneficial to the VPMN for inbound roamers. Furthermore, the VPMN might not offer facilities such as prepaid, ring-back tone, GMSC-rerouted CDR for MT roaming call billing etc, offered by the HPMN of the call-receiving inbound roamers.

To solve the aforesaid problem, the optimal routing can be controlled by the HPMN operator by using the MO-CSI. The optimal routing can be applied when the calling outbound roamer and the receiving call outbound roamer are both on the network of the same group of operators. Therefore, the HPMN (of both roamers) and the HPMN dynamic CAMEL Gateway know the receiving call outbound roamer is not affected by the optimal routed call. If there is a dynamic CAMEL Gateway (maybe centrally) deployed for each operator of the same group, the optimal routed call can also be defined between a local and an outbound roamer of the same group and between an outbound roamer of one operator and an outbound roamer of another operator, all within the same group. The communication between the individual operator dynamic CAMEL gateway can be via a private TCP/IP secure network.

The dynamic CAMEL gateway for optimal routing can control the routing of the call to a special route (using #MSRN) where termination interconnection loss for the VPMN (eg. when the group network or leased-line direct connect is used for interconnection) is not present between the VPMN and the HPMN. It can even be effectively routed to the HPMN via VoIP and routed back to the VPMN via VoIP. Therefore, the total cost for both operators is maintained without losing any service (e.g. ringback tone) for the receiving-call outbound roamers.

After detecting a successful location update at the CAMEL supporting the VPMN of the outbound roamer of certain class (e.g. postpaid or prepaid) at step 1702, the monitoring block provides the IMSI of the outbound roamer to the Dynamic CAMEL gateway at step 1704. The Dynamic CAMEL gateway provides the MO-CSI to the VLR of the outbound roamer either by sending a stand-alone MAP ISD containing MO-CSI and IMSI to the VLR at step 1706 or by triggering the HPMN HLR to send a stand-alone MAP ISD via the HLR provisioning block at step 1708. The O-CSI for any CAMEL phase will be empty.

When the outbound roamer makes a HPMN international call, the VPMN gsmSSF transfers the call control via a CAP IDP containing the calling party number, the IMSI and the called party number to the HPMN gsmSCF at step 1710. The HPMN gsmSCF interrogates the HLR about the routing number of the called party at step 1712. The HLR provides the routing number (MSRN) to the HPMN gsmSCF at step 1714. The HPMN gsmSCF in turn returns a routing number (#MSRN) dynamically selected from a pool that maps to the real MSRN to the VPMN gsmSSF at step 1716.

The foregoing description describes some of the applications for controlling MT-calls of the outbound roamers using the present invention.

FIG. 18 illustrates a flow diagram for optimal routing on late call forwarding for the outbound roamers in accordance with an embodiment of the present invention. After detecting a successful location update at the CAMEL supporting VPMN of the outbound roamer at step 1802, the monitoring block provides the IMSI of the outbound roamer to the Dynamic CAMEL gateway at step 1804. The Dynamic CAMEL gateway issues a MAP ISD command to the VPMN VLR/VMSC to erase the late call forwarding entry at step 1806. It is assumed that all late call forwarding FTNs are the same. The Dynamic CAMEL gateway stores the late call forwarding numbers obtained from the LUP and ISD exchange of the location update in its database.

The Dynamic CAMEL gateway provides the MT-CSI to the HPMN HLR of the outbound roamer via the HLR provisioning block at step 1808. To direct a MT call to the outbound roamer, the HPMN GMSC/STP issues a MAP SRI command to the HPMN HLR at step 1810 and gets the MT-CSI from the HPMN HLR at step 1812. The HPMN GMSC/STP issues a CAP IDP containing the calling party number and the called party number to the HPMN gsmSCF at step 1814. When the HPMN gsmSCF receives the MAP ISD, it may send the MAP ISD to the VLR to erase the late call forwarding entry if it was not done while the location update was monitored. The HPMN gsmSCF can dynamically determine late call forwarding numbers from the HPMN HLR using MAP InterrogateSS or SendParameters.

If the outbound roamer is busy, the HPMN gsmSCF returns a RRB (busy/no answer) to the HPMN GMSC/STP at step 1816. The HPMN GMSC/STP issues the MAP SRI to the HPMN HLR again after sometime at step 1818. The HPMN HLR returns a MSRN at step 1820 to which the MT call is routed at step 1822. If the outbound roamer is busy, the VPMN VLR/VMSC issues REL (busy) to the HPMN GMSC/STP at step 1824. The HPMN GMSC/STP issues ERB (busy) to the HPMN gsmSCF to update the availability of the outbound roamer at step 1826. The gsmSCF may then issue Connect (calling party number, FTN of the called party) at step 1828. It may thus be seen from the description of FIG. 18 that the late call forwarding of the outbound roamer is dealt at the HLR.

However, if the outbound roamer is already equipped with a T-CSI, it can be handled via CAP relay through a CAP relay proxy to the HPMN gsmSCF.

FIG. 19 illustrates a flow diagram for incoming call screening for the outbound roamers in accordance with an embodiment of the present invention. After detecting a successful location update at the CAMEL supporting VPMN of the outbound roamer at step 1902, the monitoring block provides the IMSI of the outbound roamer to the Dynamic CAMEL gateway at step 1904. The Dynamic CAMEL gateway provides the MT-CSI to the HPMN HLR of the outbound roamer via the HLR provisioning block at step 1906. The Dynamic CAMEL gateway supports a SMS and USSD or IVR interface for the outbound roamer to define blacklist and whitelist of allowed callers.

When the MT call is to be forwarded to the outbound roamer, it is directed to the HPMN GMSC/STP at step 1908. The HPMN GMSC/STP issues a MAP SRI command to the HPMN HLR at step 1910 and obtains the MT-CSI from the HPMN HLR at step 1912. The HPMN GMSC/STP issues a CAP IDP for the HPMN gsmSCF at step 1914. When the HPMN gsmSCF receives CAP IDP, it checks the blacklist and whitelist to ascertain whether the call is allowed or not. If the call is allowed, it continues the MT call, otherwise it connects to a Voicemail or drops the call at step 1916.

However, if the outbound roamer is already equipped with the T-CSI, it can be handled via CAP relay through a CAP relay proxy to the HPMN gsmSCF.

FIG. 20 illustrates a flow diagram for prepaid roaming for MT call for the outbound roamers in accordance with an embodiment of the present invention. After detecting a successful location update at the CAMEL supporting the VPMN of the outbound roamer at step 2002, the monitoring block provides the IMSI of the outbound roamer to the dynamic CAMEL gateway at step 2004. The dynamic CAMEL gateway provides the MT-CSI to the HPMN HLR of the outbound roamer via the HLR provisioning block at step 2006. When the MT call is made for the outbound roamer, it is directed to the HPMN GMSC/STP at step 2008. The HPMN GMSC/STP issues a MAP SRI command to the HPMN HLR at step 2010 and obtains the MT-CSI from the HPMN HLR at step 2012. The HPMN GMSC/STP issues a CAP IDP for the HPMN gsmSCF at step 2014. When the HPMN gsmSCF receives the MAP ISD, it monitors answer/disconnect events in an interrupt mode. If the duration of the MT call exceeds the balance, it issues ReleaseCall, otherwise, it records the accounting and deduces the balance of the MT call. The accounting can be done using the VMSC location of the outbound roamer sent in CAP IDP.

The HPMN GMSC/STP issues the MAP SRI to the HPMN HLR again at step 2018. The HPMN HLR returns the routing number (MSRN) at step 2020. The HPMN GMSC/STP directs the MT call containing the calling party number and the MSRN to the VPMN VLR/VMSC at step 2022. If the outbound roamer replies, the VPMN VLR/VMSC issues ANM to the HPMN GMSC/STP at step 2024. The HPMN GMSC/STP issues ERB (answer) to the HPMN gsmSCF to start accounting at step 2026. If the call duration exceeds the balance of the outbound roamer, the VPMN VLR/VMSC issues a release command (REL) to the HPMN GMSC/STP at step 2028. The HPMN GMSC/STP issues ERB (answer) to the HPMN gsmSCF to end accounting at step 2030.

However, if the outbound roamer is already equipped with a T-CSI, it can be handled via CAP relay through a CAP relay proxy to the HPMN gsmSCF.

Other Variations

Provided above for the edification of those of ordinary skill in the art, and not as a limitation on the scope of the invention, are detailed illustrations of a scheme for generating and provisioning the CSI of the outbound roamer in a wireless communication network, who has moved onto a VPMN and is detected as being registering with the VPMN. Numerous variations and modifications within the spirit of the present invention will of course occur to those of ordinary skill in the art in view of the embodiments that have now been disclosed. For example, while in the described embodiments, the present invention is implemented primarily from the point of view of GSM mobile networks, the present invention may also be effectively implemented on CDMA, 3G, WCDMA, GPRS, etc., or any other network of common carrier telecommunications in which end users are normally configured to operate within a "home" network to which they normally subscribe, but have the capability of also operating on other neighboring or remote visited networks.

The examples under the present invention, detailed in the illustrative examples contained here, are described using terms and constructs drawn largely from GSM mobile telephony infrastructure. However, use of these examples should not be interpreted to limiting the invention to those media. The capabilities of the visited or non-accustomed network can be of use and provided through any type of telecommunications medium, including without limitation: (i) any mobile telephony network including, without limitation, GSM, 3GSM, 3G, CDMA, WCDMA or GPRS, satellite phones or other mobile telephone networks or systems; (ii) any so-called WiFi apparatus normally used in a home or subscribed network, but also configured for use on a visited or non-home or non-accustomed network, including apparatus not dedicated to telecommunications such as personal computers, Palm-type or Windows Mobile devices; (iii) an entertainment console platform such as Sony Playstation, PSP or other apparatus that are capable of sending and receiving telecommunications over home or non-home networks, or even (iv) fixed-line devices made for receiving communications, but capable of deployment in numerous locations while preserving a persistent subscriber id such as the eye2eye devices from Dlink; or telecommunications equipment meant for voice over IP communications such as those provided by Vonage or Packet8.

In describing certain embodiments of dynamic CSI generation under the present invention, this specification follows the path of a telecommunications call from a calling party to a subscriber or calling party. For the avoidance of doubt, that call can be for a normal voice call, in which the subscriber telecommunications equipment is also capable of visual, audiovisual or motion-picture display. Alternatively, those devices or calls can be for text, video, pictures or other communicated data.

TECHNICAL REFERENCES

GSM 902 on MAP specification
Digital cellular telecommunications system (Phase 2+)
Mobile Application Part (MAP) Specification
(3GPP TS 09.02 version 7.9.0 Release 1998)
GSM 340 on SMS
Digital cellular telecommunications system (Phase 2+)
Technical realization of the Short Message Service (SMS)
(GSM 03.40 version 7.4.0 Release 1998)
GSM 378 on CAMEL
Digital cellular telecommunications system (Phase 2+)
Customised Applications for Mobile network Enhanced Logic (CAMEL) Phase 2
Stage 2
(GSM 03.78 version 6.7.0 Release 1997)
GSM 978 on CAMEL Application protocol
Digital cellular telecommunications system (Phase 2+)
Customised Applications for Mobile network Enhanced Logic (CAMEL)
CAMEL Application Part (CAP) specification
(GSM 09.78 version 7.1.0 Release 1998)
GSM 379 on CAMEL Support of Optimal Routing (SOR)
Digital cellular telecommunications system (Phase 2+)
Support of Optimal Routing (SOR)

Technical realization
(GSM 03.79 version 7.3.0 Release 1998)
GSM 318 on CAMEL Basic Call Handling
Digital cellular telecommunications system (Phase 2+)
Basic call handling
Technical realization
(GSM 03.18 version 6.6.0 Release 1997)
1. 3G TS 22.078 version 3.2.0 Release 1999
UMTS CAMEL Service Description Stage 1
2. 3G TS 23.278 version 6.0.0 Release 6
UMTS CAMEL-IMS interworking
ITU-T Recommendation Q.1214 (1995), Distributed functional plane for intelligent network CS-1.
ITU-T Recommendation Q.1218 (1995), Interface Recommendation for intelligent network CS-1.
ITU-T Recommendation Q.762 (1999), Signaling system No. 7—ISDN user part general functions of messages and signals.
ITU-T Recommendation Q.763 (1999), Signaling system No. 7—ISDN user part formats and codes.
ITU-T Recommendation Q.764 (1999), Signaling system No. 7—ISDN user part signaling procedures.
ITU-T Recommendation Q.766 (1993), Performance objectives in the integrated services digital network application.
ITU-T Recommendation Q.765 (1998), Signaling system No. 7—Application transport mechanism.
ITU-T Recommendation Q.769.1 (1999), Signaling system No. 7—ISDN user part

APPENDIX

| Acronym | Description |
|---|---|
| 3G | Third Generation |
| 3GSM | Third Generation GSM Services |
| BCD | Binary Coded Decimal |
| CAMEL | Customized Applications for Mobile network Enhanced Logic |
| CAP | CAMEL Application Part |
| CB | Call Barring |
| CC | Country Code |
| CDMA | Code Division Multiple Access |
| CDR | Call Detail Record |
| CLI | Calling Line Identification |
| CON | IN/CAMEL Connect |
| CSD | CAMEL Support Database |
| CSI | CAMEL Subscription Information |
| CUE | IN/CAMEL Continue |
| D-CSI | Dialled service CSI |
| DPC | Destination Point Code |
| ERB | Event Report Basic call state machine |
| FTN | Forward To Number |
| GMSC | Gateway MSC |
| GMSC-H | HPMN Gateway MSC |
| GPRS | General Packet Radio Service |
| GPRS-CSI | GPRS CSI |
| GSM | Global System for Mobile communication |
| gsmSCF | GSM service control function |
| gsmSSF | GSM service switch function |
| GT | Global Title |
| HLR | Home Location Register |
| HLR-H | HLR from HPMN |
| HPMN | Home Public Mobile Network |
| HPS | HLR Provisioning System |
| IAM | Initial Address Message |
| IDD | International Direct Dial |
| IDP | Initial Detection Point IN/CAP message |
| IMSI | International Mobile Subscriber Identifier |
| IN | Intelligent Network |
| IP | Internet Protocol |
| ISD | Insert Subscriber Data |
| ISDN | Integrated Services Digital Network |
| ISG | International Signal Gateway |
| ISUP | ISDN User Part |
| IVR | Interactive Voice Response |
| LUP | MAP Location Update |

APPENDIX-continued

| Acronym | Description |
|---|---|
| MAP | Mobile Application Part |
| MCC | Mobile Country Code |
| M-CSI | Mobility management CSI |
| ME | Mobile Equipment |
| MNC | Mobile Network Code |
| MO | Mobile Originated |
| MSC | Mobile Switch Center |
| MSISDN | Mobile Subscriber ISDN |
| MSRN | Mobile Station Roaming Number |
| MT | Mobile Terminated |
| MTP | Message Transfer Part |
| NDC | National Destination Code |
| O-CSI | Originating CSI |
| ODB | Operator Determined Barring |
| PLMN | Public Land Mobile Network |
| PRN | Provide Roaming Number |
| RRB | Request Report Basic call state machine |
| SCCP | Signal Connection Control Part |
| SCP | Service Control Point |
| SGSN | Service GPRS Support Node |
| SMS | Short Message Service |
| SMS-CSI | Short Message Service-CSI |
| SPC | Signal Point Code |
| SRI | Send Routing Information |
| SRI-SM | Send Routing Information for Short Message |
| SS7 | Signaling System 7 |
| SS-CSI | Supplementary Service CSI |
| SSP | Service Switch Point |
| STP | Signal Transfer Point |
| STP-H | HPMN STP |
| TCP | Transmission Control Protocol |
| T-CSI | Terminating CSI |
| TDP | Telocator Data Protocol |
| TIF-CSI | Translation Information Flag CSI |
| USSD | Unstructured Supplementary Service Data |
| VHE | Virtual Home Environment |
| VLR | Visited Location Register |
| VLR-V | VLR from VPMN |
| VMSC | Visited Mobile Switch Center |
| VMSC-V | VMSC from VPMN |
| VoIP | Voice over Internet Protocol |
| VPMN | Visited Public Mobile Network |
| VT-CSI | Visiting network Terminating CSI |
| WCDMA | Wide-band CDMA |
| WIN | Wireless Intelligent Network |

What is claimed is:

1. A system for providing Mobile Originated CAMEL Subscription Information (MO-CSI) of an outbound roamer of a Home Public Mobile Network (HPMN), wherein the outbound roamer is roaming in a Visited Public Mobile Network (VPMN), the system comprising:
a monitoring block to monitor Mobile Application Part (MAP) transaction messages between a VPMN VLR/VMSC and a Home Location Register (HLR) of the HPMN;
a roamers database storing an outbound roamer record of at least one outbound roamer, wherein the outbound roamer record comprises at least the International Mobile Subscriber Identity (IMSI) of the outbound roamer;
a detection block to detect whether provisioning of MO-CSI is required for the outbound roamer;
a CAMEL support identification logic to identify the phase of CAMEL supported by the VPMN
a CSI generation block to dynamically generate the MO-CSI of the outbound roamer based on at least the ISMI in the outbound roamer record, if the provisioning of the CSI is required; and
a provisioning block to provision the generated MO-CSI of the outbound roamer to at least one CSI storing node.

2. A system for providing Customized Applications for Mobile network Enhanced Logic (CAMEL) Subscription Information (CSI) of an outbound roamer of an Home Public Mobile Network (HPMN), wherein the outbound roamer is roaming in a Visited Public Mobile Network (VPMN), the system comprising:
a roamers database storing an outbound roamer record of at least one outbound roamer, wherein the outbound roamer record comprises at least the International Mobile Subscriber Identity (IMSI) of the outbound roamer
a detection block to detect whether provisioning of the CSI is required for the outbound roamer;
a CSI generation block to dynamically generate the CSI of the outbound roamer based on at least the IMSI in the outbound roamer record, if the provisioning of the CSI is required; and
a provisioning block to provision the generated CSI of the outbound roamer to at least one CSI storing node.

3. The system of claim 2, wherein a CSI storing node is selected from a group consisting of a Home Location Register (HLR) of the HPMN and a Visited Location Register (VLR) of a VPMN.

4. The system of claim 2, further comprising a monitoring block to monitor Mobile Application Part (MAP) transaction messages between a VPMN VLR/VMSC and the HLR and store at least the IMSI of the outbound roamer in the roamers database.

5. The system of claim 4, wherein the MAP transaction message is a MAP Location Update (LUP).

6. The system of claim 4, wherein the monitoring block is communicatively coupled with the roamers database using a protocol selected from the group consisting of Transmission Control Protocol (TOP)/Internet Protocol (IP).

7. The system of claim 2, wherein the CSI comprises a service key and an address of a Global System for Mobile communication Service Control Function (gsmSCF).

8. The system of claim 2, wherein the CSI comprises at least one of a Mobile Originated (MO)-CSI and a Mobile Terminated (MT)-CSI.

9. The system of claim 8, wherein the MO-CSI comprises the address of a Global System for Mobile communications Service Control Function (gsmSCF).

10. The system of claim 9, wherein the gsmSCF provides call control services for at least one of short code dialing, misdialed digits correction, Calling Line Identification (CLI) guarantee, pre-paid roaming, roaming fraud detection, and optimal routing for the outbound roamer.

11. The system of claim 8, wherein the MT-CSI comprises the address of a Global System for Mobile communications Service Control Function (gsmSCF).

12. The system of claim 11, wherein the gsmSCF provides call control services for at least one of optimal routing for late call forwarding, incoming call screening, and prepaid roaming for the outbound roamer.

13. The system of claim 2, wherein the detection block is configured to identify whether the CSI for the outbound roamer is defined at the CSI storing node in response to a successful Location Update (LUP) from the outbound roamer.

14. The system of claim 2, wherein the detection block is configured to detect whether the CSI defined at the CSI storing node conforms to the CAMEL phase supported by the CSI storing node.

15. The system of claim 2, wherein the CSI generation block is configured to generate at least one of MO-CSI and MT-CSI.

16. The system of claim 1, further comprising a CAMEL support identification logic to identify the phase of CAMEL supported by the VPMN.

17. The system of claim 16, wherein the CAMEL support identification logic comprises a CAMEL support database maintaining information of the CAMEL phases supported by at least one VPMN.

18. The system of claim 17, wherein the CSI generation block is configured to generate MO-CSI comprising at least one of O-CSI, TDP-Criteria for O-CSI, Dialled service (D)-CSI, SS-CSI, Visiting network Terminating (VT)-CSI, TDP-Criteria for VT-CSI, Short Mobile Service (SMS)-CSI, Mobility management (M)-CSI, General Packet Radio Service (GPRS)-CSI, TDP Criteria for GPRS-CSI, and TIF-CSI, if the VPMN is identified to support CAMEL phase 3.

19. The system of claim 16, wherein the CSI generation block is configured to generate MO-CSI comprising O-CSI, if the VPMN is identified to support CAMEL phase 1.

20. The system of claim 16, wherein the CSI generation block is configured to generate MO-CSI comprising at least one of O-CSI, TDP-Criteria for O-CSI, Supplementary Service (SS)-CSI, and Translation Information Flag (TIF)-CSI, if the VPMN is identified to support CAMEL phase 2.

21. The system of claim 2, wherein the provisioning block is configured to send a stand-alone Mobile Application Part (MAP) Insert Subscriber Data (ISD) to provision a record of CSI to at least one CSI storing node.

22. The system of claim 21, wherein the MAP ISD is issued using the IMSI of the outbound roamer.

23. The system of claim 21, wherein the MAP ISD is issued using the IMSI of the outbound roamer.

24. The system of claim 2, further comprising an HLR provisioning block configured to receive the CSI from the provisioning block and provision a record of the CSI in the HLR of the HPMN.

25. The system of claim 24, wherein the HLR provisioning block is further configured to trigger the HLR of the HPMN to send a stand-alone MAP ISD to provision the CSI to the VLR of the VPMN.

26. The system of claim 2, wherein the provisioning block is configured to receive a Send Request Information (SRI) from a Gateway Mobile Switching Centre (GMSC), wherein the SRI is not CAMEL suppressed and send CSI to the HPMN GMSC.

27. The system of claim 26, wherein the SRI is routed using a protocol selected from a group consisting of a translation type, a Message Transfer Part (MTP) level point code routing and HLR mapping.

28. The system of claim 2, wherein the provisioning block is configured to de-provision the CSI at the HLR of the HPMN if at least one of the following conditions is true:
the outbound roamer returns to the HPMN
roaming state of the outbound roamer is timed out by HPMN; and
the record of the outbound roamer at the VLR is purged by the VPMN.

29. A method of providing Customized Applications for Mobile network Enhanced Logic (CAMEL) Subscription Information (CSI) of an outbound roamer of an Home Public Mobile Network (HPMN), wherein the outbound roamer is roaming in a Visited Public Mobile Network (VPMN), the method comprising:
storing an outbound roamer record of at least one outbound roamer, wherein the outbound roamer record comprises at least the International Mobile Subscriber Identity (IMSI) of the outbound roamer;

detecting whether provisioning of the CSI is required for the outbound roamer;
dynamically generating the CSI of the outbound roamer based on at least the IMSI in the outbound roamer record of the outbound roamer, if the provisioning of the CSI is required; and
providing the generated CSI of the outbound roamer to at least one CSI storing node.

30. A method of claim 29, further comprising monitoring Mobile Application Part (MAP) transaction messages between a VPMN VLRNMSC and the HLR for storing the outbound roamer record, 31. The method of claim 29, wherein the MAP transaction messages comprise a MAP Location Update (LUP).

32. The method of claim 29, wherein the CSI comprises a service key and an address of a Global System for Mobile communication (GSM) Service Control Function (SCF).

33. The method of claim 29, wherein the CSI comprises at least one of a Mobile Originated (MO)-CSI and a Mobile Terminated (MT)-CSI.

34. The method of claim 29, wherein the step of detecting comprises identifying whether the CSI for the outbound roamer is defined at the CSI storing node in response to a successful Location Update (LUP) from the outbound roamer.

35. The method of claim 29, wherein the step of detecting comprises identifying whether CSI defined at the CSI storing node conforms to the CAMEL phase supported by the CSI storing node.

36. The method of claim 29, wherein the step of generating comprises generating at least one of MO-CSI and MT-CSI.

37. The method of claim 29, further comprising identifying the phase of CAMEL supported by the VPMN.

38. The method of claim 29, further comprising maintaining information of the CAMEL phases supported by at least one VPMN.

39. The method of claim 29, wherein the step of generating comprises generating MO-CSI comprising O-CSI, if the VPMN is identified to support CAMEL phase 1.

40. The method of claim 27, wherein the step of generating comprises generating MO-CSI comprising at least one of O-CSI, TDP-Criteria for O-CSI, Supplementary Service (SS)-CSI, and Translation Information Flag (TIF)-CSI, if the VPMN is identified to support CAMEL phase 2.

41. The method of claim 29, wherein the step of generating comprises generating MO-CSI comprising at least one of O-CSI, TDP-Criteria for O-CSI, Dialled service (D)-CSI, SS-CSI, Visiting network Terminating (VT)-CSI, TDP-Criteria for VT-CSI, Short Mobile Service (SMS)-CSI, Mobility management (M)-CSI, General Packet Radio Service (GPRS)-CSI, TDP Criteria for GPRS-CSI, and TIF-CSI, if the VPMN is identified to support CAMEL phase 3.

42. The method of claim 29, wherein the step of provisioning comprises sending a stand-alone Mobile Application Part (MAP) Insert Subscriber Data (ISD) to provision a record of the CSI to at least one CSI storing node.

43. The method of claim 29, wherein the step of provisioning comprises receiving the CSI at an HLR provisioning block and provisioning a record of the CSI in the HLR of the HPMN by the HLR provisioning block.

44. The method of claim 43, wherein the step of provisioning further comprises triggering the HLR of the HPMN for sending a stand-alone MAP ISD to provision a record of the CSI at the VLR of the VPMN.

45. The method of claim 29, wherein the step of provisioning further comprises receiving a Send Request Information (SRI), wherein the SRI is not CAMEL suppressed and sending the SRI with the CSI.

46. The method of claim 45, wherein the SRI is routed using a protocol selected from a group consisting of a translation type, a Message Transfer Part (MTP) level point code routing and HLR mapping.

47. The method of claim 29 further comprising de-provisioning the CSI at the HLR of the HPMN if at least one of the following conditions is true:
the outbound roamer returns to the HPMN;
roaming state of the outbound roamer is timed out by HPMN; and
the record of the outbound roamer at the VLR is purged by the VPMN.

48. A system for providing Mobile Terminated CAMEL Subscription Information (MT-CSI) of an outbound roamer of a Home Public Mobile Network (HPMN), wherein the outbound roamer is roaming in a Visited Public Mobile Network (VPMN), the system comprising:
a monitoring block to monitor Mobile Application Part (MAP) transaction messages between a VPMN VLR/ Visited Mobile Switch Center (VMSC) and a Home Location Register (HLR) of the HPMN;
a roamers database storing an outbound roamer record of at least one outbound roamer, wherein the outbound roamer record comprises at least the International Mobile Subscriber Identity (IMSI) of the outbound roamer
a detection block to detect whether provisioning of the MT-CSI is required for the outbound roamer;
a CSI generation block to dynamically generate the MT-CSI of the outbound roamer based on at least the IMSI in the outbound roamer record, if the provisioning of the MT-CSI is required; and
a provisioning block to provision the generated MT-CSI of the outbound roamer to at least one of the Home Location Register (HLR) of the HPMN and a HPMN Gateway Mobile Switch Center (GMSC).

49. A method for providing Mobile Originated CAMEL Subscription Information (MO-CSI) of an outbound roamer of a Home Public Mobile Network (HPMN) to a Visited Public Mobile Network (VPMN) Visited Location Register (VLR), wherein the outbound roamer is roaming in a VPMN, the method comprising:
monitoring Mobile Application Part (MAP) transaction messages between the VPMN VLR/VMSC and a Home Location Register (HLR) of the HPMN for storing an outbound roamer record, wherein the outbound roamer record comprises at least the International Mobile Subscriber Identity (IMSI) of the outbound roamer;
detecting whether provisioning of the MO-CSI is required for the outbound roamer;
identifying the phase of CAMEL supported by the VPMN;
dynamically generating the MO-CSI of the outbound roamer based on at least one of the IMSI in the outbound roamer record of the outbound roamer and the phase of CAMEL supported by the VPMN, if the provisioning of the MO-CSI is required; and
providing the generated MO-CSI of the outbound roamer to at least one CSI storing node.

50. A method for providing Mobile Terminated CAMEL Subscription Information (MT-CSI) of an outbound roamer of a Home Public Mobile Network (HPMN), wherein the outbound roamer is roaming in a Visited Public Mobile Network (VPMN), the method comprising:

monitoring Mobile Application Part (MAP) transaction messages between a VPMN VLR/VMSC and a Home Location Register (HLR) of the HPMN for storing an outbound roamer record;

storing an outbound roamer record of at least one outbound roamer, wherein the outbound roamer record comprises at least the International Mobile Subscriber Identity (IMSI) of the outbound roamer;

detecting whether provisioning of the MT-CSI is required for the outbound roamer;

dynamically generating the MT-CSI of the outbound roamer based on the IMSI in the outbound roamer record of the outbound roamer, if the provisioning of the MT-CSI is required; and providing the generated MT-CSI of the outbound roamer to at least one of HPMN HLR and HPMN Gateway Mobile Switch Center (GMSC).

* * * * *